US012730678B2

(12) United States Patent
Kita

(10) Patent No.: US 12,730,678 B2
(45) Date of Patent: Sep. 8, 2026

(54) MANAGEMENT OF HARDWARE RESOURCES INCLUDED IN A COMMUNICATION SYSTEM

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 359 days.

(21) Appl. No.: 18/572,785

(22) PCT Filed: Sep. 30, 2022

(86) PCT No.: PCT/JP2022/036743
§ 371 (c)(1),
(2) Date: Dec. 21, 2023

(87) PCT Pub. No.: WO2024/069949
PCT Pub. Date: Apr. 4, 2024

(65) Prior Publication Data

US 2025/0094226 A1 Mar. 20, 2025

(51) Int. Cl.
*G06F 9/50* (2006.01)

(52) U.S. Cl.
CPC .................................. *G06F 9/5027* (2013.01)

(58) Field of Classification Search
CPC ............................ G06F 9/5061; G06F 9/5083
See application file for complete search history.

(56) References Cited

U.S. PATENT DOCUMENTS 7,447,806 B2 * 11/2008 Reyes ....................... G06F 8/60
710/10
2005/0089063 A1 4/2005 Haruna et al.
(Continued)

FOREIGN PATENT DOCUMENTS

JP 2005128866 A 5/2005
JP 2007310749 A 11/2007
(Continued)

OTHER PUBLICATIONS

International Search Report in PCT Application No. PCT/JP2022/036742, mailed Dec. 13, 2022, 3pp.

*Primary Examiner* — Edward J Dudek, Jr.
(74) *Attorney, Agent, or Firm* — HAUPTMAN HAM, LLP

(57) ABSTRACT

It is enabled that hardware resources included in a communication system are efficiently used. When a surplus level of a hardware resource included in a special spare resource group satisfies a surplus condition, a configuration manager (76) changes, in response to a usage status of a hardware resource group satisfying a resource addition condition, an affiliation of the hardware resource included in the special spare resource group from the special spare resource group to the hardware resource group. When the surplus level of the hardware resource included in the special spare resource group does not satisfy the surplus condition, a bare metal manager (96) executes, in response to the usage status of the hardware resource group satisfying the resource addition condition, a setup on a hardware resource included in a general-purpose spare resource group, and the configuration manager (76) changes the affiliation of the hardware resource on which the setup has been executed from the general-purpose spare resource group to the hardware resource group.

14 Claims, 19 Drawing Sheets

(56) References Cited

U.S. PATENT DOCUMENTS

2006/0045039 A1 3/2006 Tsuneya et al.
2006/0271928 A1 11/2006 Gao et al.
2010/0015926 A1 1/2010 Luff
2014/0258446 A1 9/2014 Bursell
2016/0043970 A1* 2/2016 Jacob .................... G06F 9/5027
709/226
2017/0295107 A1 10/2017 Salapura et al.
2018/0157511 A1 6/2018 Krishnan et al.
2018/0219728 A1* 8/2018 Beyh ....................... H04L 41/40
2019/0052528 A1 2/2019 Yoshimura et al.
2019/0163759 A1 5/2019 Devarao et al.
2019/0176037 A1 6/2019 Leung et al.
2020/0218580 A1 7/2020 Kim
2020/0379794 A1 12/2020 Kim
2021/0255927 A1 8/2021 Kannan et al.
2022/0141140 A1 5/2022 Yang
2022/0350506 A1 11/2022 Gafni et al.
2022/0357988 A1* 11/2022 Gonuguntla ............ G06F 21/53
2022/0413931 A1 12/2022 Chiang et al.
2023/0030000 A1 2/2023 Sinha et al.
2023/0034901 A1* 2/2023 Kita .................... H04L 41/5054

FOREIGN PATENT DOCUMENTS

JP 2017169197 A 9/2017
JP 2017173894 A 9/2017
WO 2017170470 A1 10/2017
WO 2021171211 A1 9/2021

* cited by examiner

FIG.3

40
RU
42
DU
44a
CU-CP
44b
CU-UP
46
AMF
48
SMF
50
UPF

FIG.6

| SERVER ID |
|---|
| LOCATION DATA |
| BUILDING DATA |
| FLOOR NUMBER DATA |
| RACK DATA |
| SPECIFICATION DATA |
| NETWORK DATA |
| OPERATING CONTAINER ID LIST |
| CLUSTER ID |

MANAGEMENT OF HARDWARE RESOURCES INCLUDED IN A COMMUNICATION SYSTEM

RELATED APPLICATIONS

The present application is a National Phase of International Application Number PCT/JP2022/036743, filed Sep. 30, 2022.

TECHNICAL FIELD

The present invention relates to management of hardware resources included in a communication system.

BACKGROUND ART

There is a technology for managing hardware resources included in a communication system by dividing the hardware resources into a plurality of hardware resource groups. As an example of such a technology, in Patent Literature 1, it is described that an unused hardware resource for which system software corresponding to a specific type of functional unit has been set up is added to a resource pool associated with the specific type of functional unit.

Further, in Patent Literature 2 and Patent Literature 3, technologies for scaling out an application operating in a communication system, such as a virtualized network function (VNF), are described.

CITATION LIST

Patent Literature

[Patent Literature 1] WO 2021/171211 A1
[Patent Literature 2] JP 2017-173894 A
[Patent Literature 3] WO 2017/170470 A1

SUMMARY OF INVENTION

Technical Problem

In the case of managing the hardware resources included in a communication system by dividing the hardware resources into a plurality of hardware resource groups, when a large number of the hardware resources of each of the plurality of hardware resource groups are reserved in advance in anticipation of an application being scaled out, some of those hardware resources may be wasted.

The present invention has been made in view of the above-mentioned circumstance, and has an object to enable efficient use of hardware resources included in a communication system.

Solution to Problem

In order to solve the above-mentioned problem, according to one embodiment of the present disclosure, there is provided a resource management system including: usage status monitoring means for monitoring a usage status of each of a plurality of hardware resource groups included in a communication system; resource addition means for changing, in response to the usage status of any one of the plurality of hardware resource groups satisfying a resource addition condition associated with the hardware resource group, an affiliation of a hardware resource included in a common spare resource group different from all of the plurality of hardware resource groups from the common spare resource group to the hardware resource group; and setup execution means for executing a setup corresponding to a predetermined type of application, wherein the resource addition means is configured to change, when a surplus level of a hardware resource included in a special spare resource group which is a part of the common spare resource group and which includes hardware resources on which the setup corresponding to the predetermined type has been executed satisfies a predetermined surplus condition, in response to the usage status of any one of the plurality of hardware resource groups in which the predetermined type of the application is operating satisfying the resource addition condition associated with the hardware resource group, the affiliation hardware resource included in the special spare resource group from the special spare resource group to the hardware resource group, and wherein the setup execution means is configured to execute, when the surplus level of the hardware resource included in the special spare resource group does not satisfy the predetermined surplus condition, in response to the usage status of any one of the plurality of hardware resource groups in which the predetermined type of the application is operating satisfying the resource addition condition associated with the hardware resource group, the setup corresponding to the predetermined type of the application on a hardware resource included in a general-purpose spare resource group which is a part of the common spare resource group and which includes hardware resources on which the setup has not been executed, and the resource addition means is configured to change the affiliation of the hardware resource on which the setup has been executed from the general-purpose spare resource group to the hardware resource group.

Further, according to one embodiment of the present disclosure, there is provided a resource management method including: monitoring a usage status of each of a plurality of hardware resource groups included in a communication system; changing, when a surplus level of a hardware resource included in a special spare resource group which is a part of a common spare resource group different from all of the plurality of hardware resource groups and which includes hardware resources on which a setup corresponding to a predetermined type of application has been executed satisfies a predetermined surplus condition, in response to the usage status of any one of the plurality of hardware resource groups in which the predetermined type of the application is operating satisfying a resource addition condition associated with the hardware resource group, an affiliation of the hardware resource included in the special spare resource group from the special spare resource group to the hardware resource group; and executing, when the surplus level of the hardware resource included in the special spare resource group does not satisfy the predetermined surplus condition, in response to the usage status of any one of the plurality of hardware resource groups in which the predetermined type of the application is operating satisfying the resource addition condition associated with the hardware resource group, a setup corresponding to the predetermined type of the application on a hardware resource included in a general-purpose spare resource group which is a part of the common spare resource group and which includes hardware resources on which the setup has not been executed, and changing the affiliation of the hardware resource on which the setup has been executed from the general-purpose spare resource group to the hardware resource group.

BRIEF DESCRIPTION OF DRAWINGS

FIG. 3 is a diagram for schematically illustrating an example of a network service in the one embodiment of the present invention.

FIG. 6 is a diagram for illustrating an example of data structure of physical inventory data.

DESCRIPTION OF EMBODIMENTS

One embodiment of the present invention is now described in detail with reference to the drawings.

Figure 1:
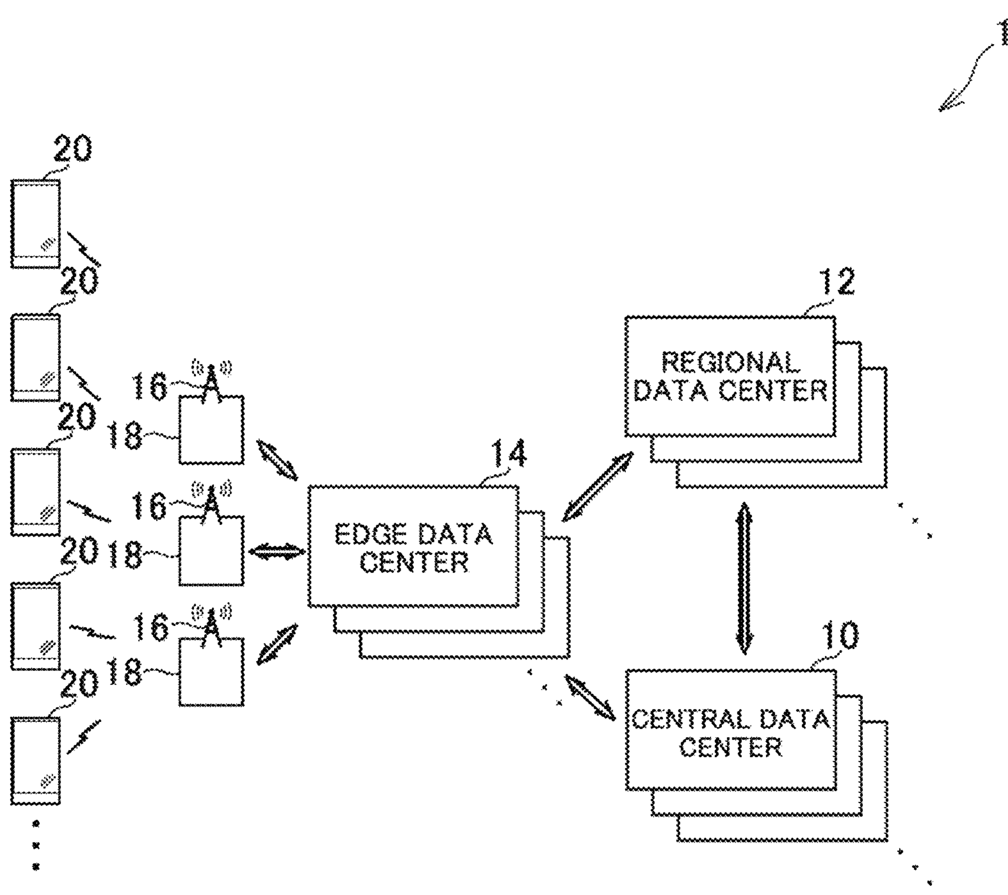
FIG. 1 is a diagram for illustrating an example of a communication system in one embodiment of the present invention.
Figure 2:
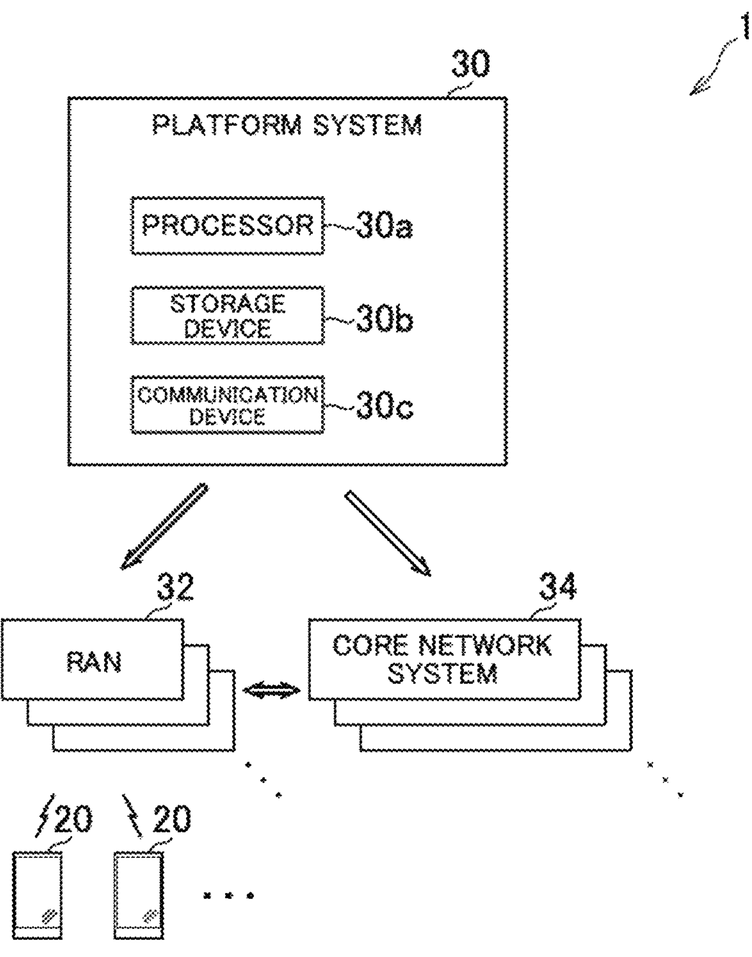
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to and from a communication facility 18 provided with an antenna 16. In this case, as illustrated in FIG. 1, one edge data center 14 may be capable of communicating to and from several communication facilities 18. The communication facility 18 may include a computer such as a server computer. The communication facility 18 in this embodiment performs radio communication a user equipment (VE) 20 via the antenna 16. The communication facility 18 provided with the antenna 16 is provided with, for example, a radio unit (RU), which is described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate to and from one another. Communication can also be performed between the central data centers 10, between the regional data centers 12, and between the edge data centers 14.

As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30*a*, a storage device 30*b*, and a communication device 30*c*, as illustrated in FIG. 2. The processor 30*a* is a program control device such as a microprocessor which operates in accordance with a program installed in the platform system 30. The storage device 30*b* is, for example, a storage element such as a ROM or RAM, a solid state drive (SSD), a hard disk drive (HDD), or the like. The storage device 30*b* stores a program to be executed by the processor 30*a*, and the like. The communication device 30*c* is, for example, a communication interface such as a network interface controller (NIC) or a wireless local area network (LAN) module. Software-defined networking (SDN) may be implemented in the communication device 30*c*. The communication device 30*c* exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service, such as a voice communication service, a data communication service, or the like, is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication to and from other users via the RAN 32 or the core network system 34. The UE 20 of the end user can also access a data network such as the Internet via the RAN 32 or the core network system 34.

In addition, in this embodiment, an Internet of things (IoT) service may be provided to an end user who uses a robot arm, a connected car, or the like. In this case, an end user who uses, for example, a robot arm, a connected car, or the like may be a purchaser of the network service in this embodiment.

In this embodiment, container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in this embodiment is formed of one or a plurality of functional units (for example, network function (NF)). In this embodiment, the functional unit is implemented by the NF implemented by the virtualization technology. The NE implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or a plurality of CNFs. The functional unit in this embodiment may also correspond to a network node.

Figure 3:
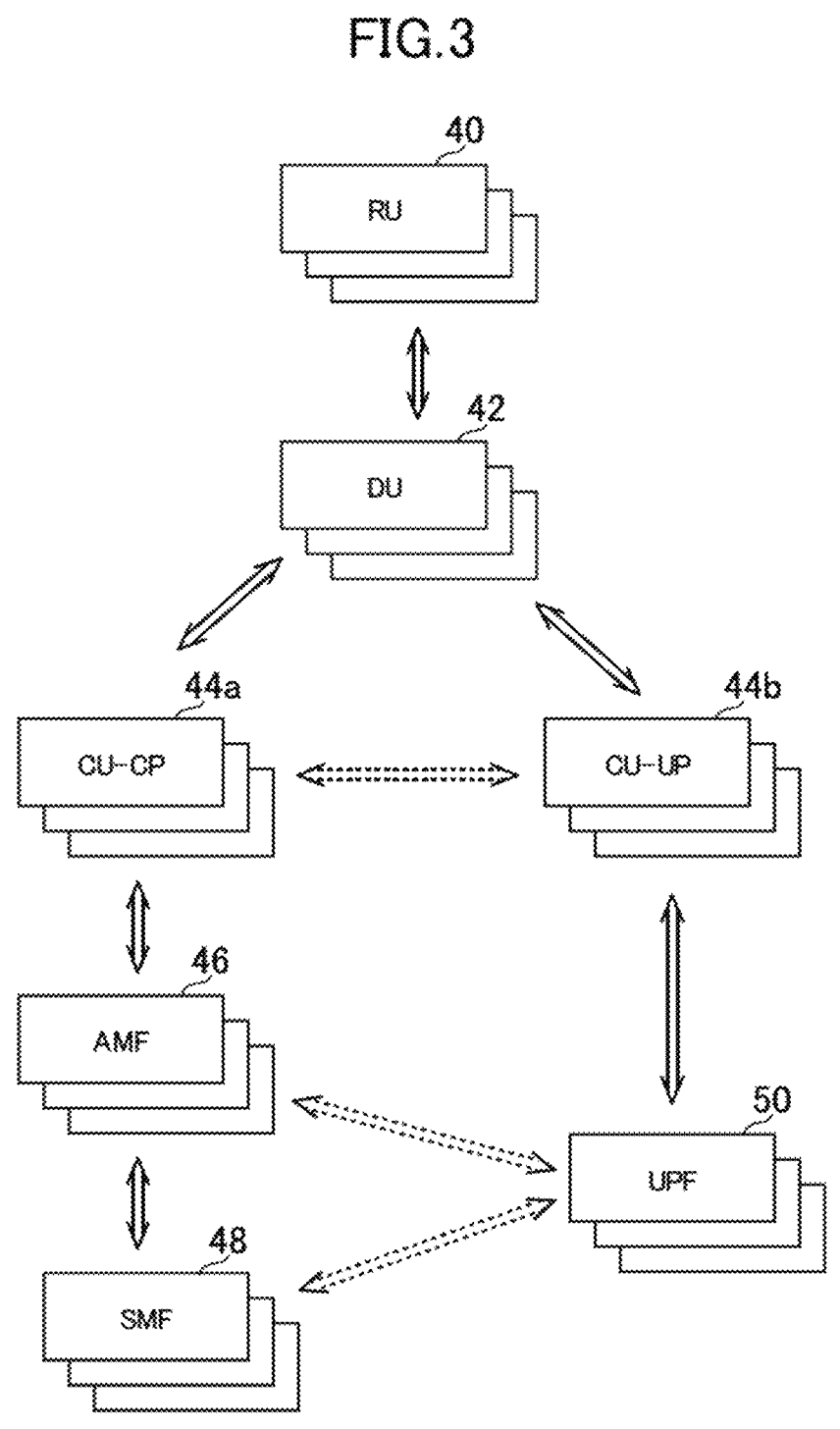

FIG. 3 is a diagram for schematically illustrating an example of an operating network service. The network service illustrated in FIG. 3 includes NFs, such as a plurality of RUS 40, a plurality of DUs 42, a plurality of CUs 44 (central unit-control planes (CU-CPs) 44*a* and central unit-user planes (CU-UPs) 44*b*), a plurality of access and mobility management functions (AMFs) 46, a plurality of session management functions (SMFs) 48, and a plurality of user plane functions (UPFs) 50, as software elements.

In the example of FIG. 3, the RUs 40, the DUs 42, the CU-CPs 44*a*, the AMFs 46, and the SMFs 48 correspond to elements of the control plane (C-plane), and the RUs 40, the DUs 42, the CU-UPs 44*b*, and the UPEs 50 correspond to elements of the user plane (U-plane).

The network service may include other types of NEs as software elements. In addition, the network service is implemented on a plurality of servers or other computer resources (hardware elements).

In this embodiment, for example, the network service illustrated in FIG. 3 provides a communication service in a certain area.

In this embodiment, it is also assumed that the plurality of RUs 40, the plurality of DUs 42, the plurality of CU-UPS 44*b*, and the plurality of UPFs 50, which are illustrated in FIG. 3, belong to one end-to-end network slice.

Figure 4:
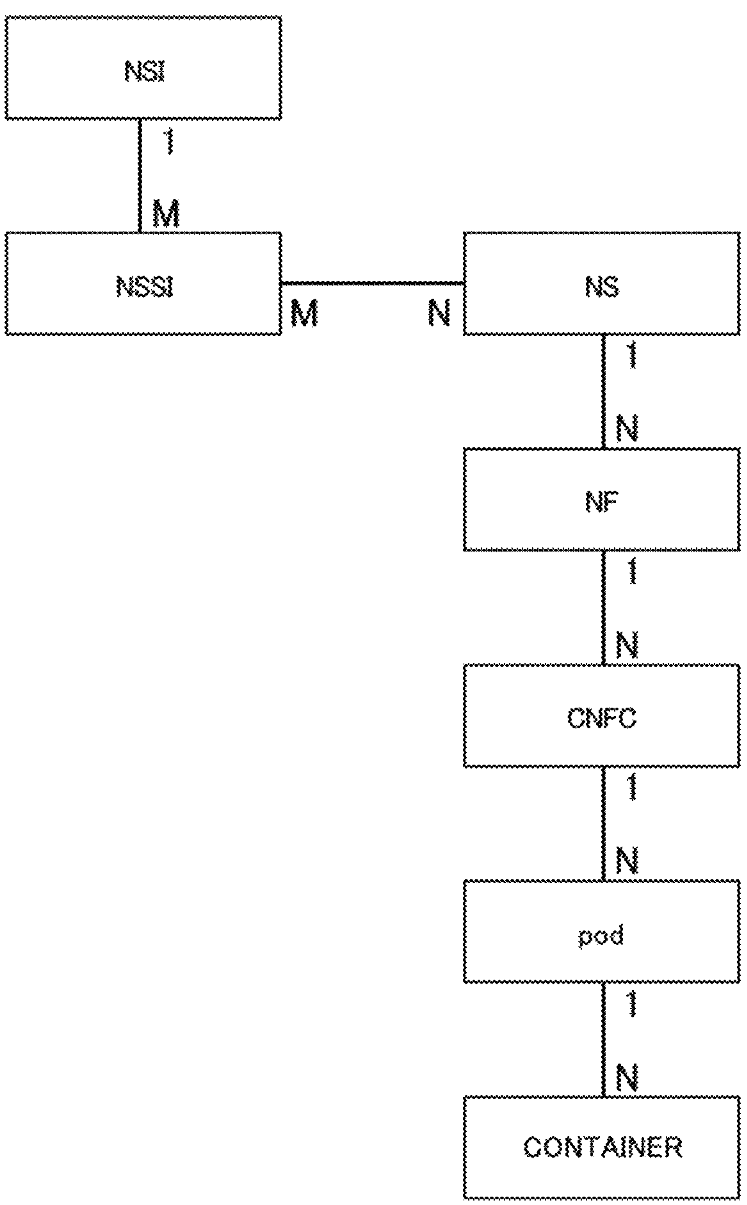
FIG. 4 is a diagram for illustrating an example of links between elements constructed in the communication system in the one embodiment of the present invention.

FIG. 4 is a diagram for schematically illustrating an example of links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the RU, the DU, the CU-UP, the AMF, the SMF, or the UPF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NFs. That is, one or a plurality of NEs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In this embodiment, for example, one NE includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice subnet instance (NSSI) have (NSI) and a network slice hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
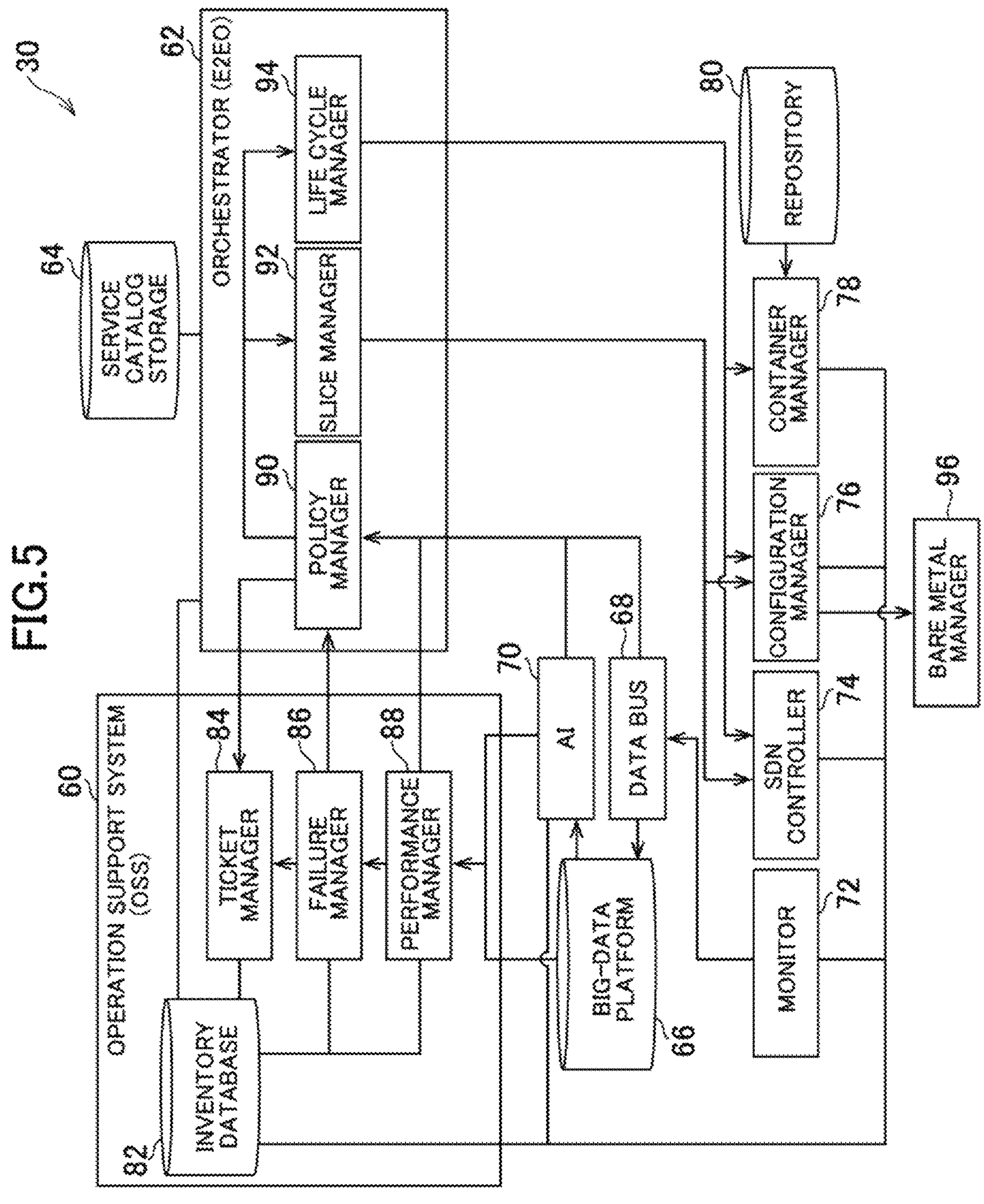
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation support system (OSS) 60, an orchestrator (end-to-end-orchestrator (E2EO)) 62, a service catalog storage 64, a big-data platform 66, a data bus 68, an artificial intelligence (AI) 70, a monitor 72, an SDN controller 74, a configuration manager 76, a container manager 78, a repository 80, and a bare metal manager 96. The OSS 60 includes an inventory database 82, a ticket manager 84, a failure manager 86, and a performance manager 88. The E2EO 62 includes a policy manager 90, a slice manager 92, and a life cycle manager 94. Those elements are implemented mainly by the processor 30*a*, the storage device 30*b* and the communication device 30*c*.

The functions illustrated in FIG. 5 may be implemented by executing, by the processor 30*a*, a program that is installed in the platform system 30, which is one or a plurality of computers, and that includes instructions corresponding to the functions. This program may be supplied to the platform system 30 via a computer-readable information storage medium, such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

In this case, the platform system 30 in this embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network system 34) managed by the container manager 78, or another server that is annexed to the server managed by the container manager 78.

In this embodiment, the repository 80 stores, for example, a container image of a container included in a functional unit group (for example, NF group) that implements a network service.

The inventory database 82 is a database in which inventory information is stored. The inventory information includes, for example, information on a server arranged in the RAN 32 or the core network system 34 and managed by the platform system 30.

Further, in this embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NEs belonging to the certain network slice.

The inventory data may also include data indicated by the current status of, for example, a geographical relationship or a topological relationship between the elements included in the communication system 1. As described above, the inventory data includes location data indicating locations which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such an as identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to a CNFC. The CNFC data indicates, for example, attributes such as an identifier of an instance and the type of the CNFC. The logical inventory data may also include pod data indicating information relating to a pod included in the CNFC. The pod data indicates, for example, attributes such as an identifier of an instance of the pod and the type of the pod. The logical inventory data may also include container data indicating information relating to a container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NF data.

The logical inventory data may also include data indicating NSSAI including one or a plurality of pieces of S-NSSAI, which is set for each NF.

Further, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The service catalog storage 64 stores service catalog data. The service catalog data may include, for example, service template data indicating the logic to be used by the life cycle manager 94 or the like. This service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNFs or other functional units included in the network service for each type thereof. The NSD may also indicate a file name of a CNFD described later, which relates to the CNF included in the network service.

Further, a CNF descriptor (CNFD) is an example of the above-mentioned service template data. The CNFD may indicate computer resources (for example, CPU, memory, and hard disk drive) required by the CNF. For example, the CNFD may also indicate, for each of a plurality of containers included in the CNF, computer resources (such as CPU, memory, and hard disk drive) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute this workflow script, to thereby instruct the container manager 78 to deploy the container included in the new network service to be purchased. Then, the container manager 78 may acquire the container image of the container from the repository 80 and deploy a container Corresponding to the container image in the server.

In addition, in this embodiment, the life cycle manager 94 executes, for example, scaling or replacement of the element included in the communication system 1. In this case, the life cycle manager 94 may output a container deployment instruction or deletion instruction to the container manager 78. Then, the container manager 78 may execute, for example, a process for deploying a container or a process for deleting a container in accordance with the instruction. In this embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates a communication route connecting those two IP addresses to each other. The created communication route may be managed so as to be linked to those two IP addresses.

The life cycle manager 94 may also output to the SDN controller 74 an instruction to create a communication route between two IP addresses linked to the two IP addresses.

In this embodiment, the slice manager 92 executes, for example, instantiation of a network slice. In this embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the third generation partnership project (3GPP) (trademark) specification "TS28 533." The NSMF is a function for generating and managing network slices, and provides an NSI management service. The NSSMF is a function for generating and managing network slice subnets forming a part of a network slice, and provides an NSSI management service.

The slice manager 92 may output to the configuration manager 76 a configuration management instruction related to the instantiation of the network slice. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In this embodiment, for example, the configuration manager 76 executes configuration management such as settings of the element group including the NEs in accordance with the configuration management instruction received from the life cycle manager 94 or the slice manager 92.

In this embodiment, for example, the SDN controller 74 creates the communication route between the two IP addresses linked to the creation instruction in accordance with the instruction to create the communication route, which has been received from the life cycle manager 94 or the slice manager 92. The SDN controller 74 may create a communication route between two IP addresses through use of, for example, a publicly known path calculation method such as Flex Algo.

In this case, for example, the SDN controller 74 may use segment routing technology (for example, segment routing IPv6 (SRv6)) to construct an NSI and NSSI for the server or an aggregation router present between communication routes. The SDN controller 74 may also generate an NSI and NSSI extending over a plurality of NEs to be set by issuing, to the plurality of NEs to be set, a command to set a common virtual local area network (VLAN) and a command to assign a bandwidth and a priority indicated by the setting information to the VLAN.

The SDN controller 74 may change the maximum value of the bandwidth that can be used for communication between two IP addresses without constructing a network slice.

The platform system 30 in this embodiment may include a plurality of SDN controllers 74. Each of the plurality of SDN controllers 74 may execute a process such as the creation of a communication route for a network device group including the AGs associated with the SDN controller 74.

In this embodiment, the monitor 72 monitors, for example, the element group included in the communication system 1 based on a given management policy. In this case, for example, the monitor 72 may monitor the element group based on a monitoring policy designated by the purchaser when the purchaser purchases the network service.

In this embodiment, the monitor 72 executes monitoring at various levels, such as a slice level, an NS level, an NF level, a CNFC level, and a level of hardware such as the server.

For example, the monitor 72 may set a module for outputting metric data in the hardware such as the server, or a software element included in the communication system 1 so that monitoring can be performed at the various levels described above. In this case, for example, the NF may output the metric data indicating a metric that can be measured (can be identified) by the NF to the monitor 72. Further, the server may output the metric data indicating a metric relating to the hardware that can be measured (can be identified) by the server to the monitor 72.

In addition, for example, the monitor 72 may deploy, in the server, a sidecar container for aggregating the metric data indicating the metrics output from a plurality of containers in units of CNFCs (microservices). This sidecar container may include an agent called "exporter." The monitor 72 may repeatedly execute a process for acquiring the metric data aggregated in units of microservices from the sidecar container, at predetermined monitoring intervals through use of a mechanism Prometheus capable of a monitoring tool, for example, monitoring the container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

In this embodiment, for example, the monitor 72 executes a process (enrichment) for aggregating metric data in predetermined units of aggregation to generate performance index value data indicating the performance index values of the elements included in the communication system 1 in the units of aggregation.

For example, for one gNB, the metric data indicating the metrics of the elements under control of the gNB (for example, network nodes such as DUs 42 and CUs 44) is aggregated to generate the performance index value data of the gNB. In this way, performance index value data indicating a communication performance in the area covered by the gNB is generated. For example, performance index value data indicating a plurality of types of communication performance, such as traffic amount (throughput) and latency, may be generated in each gNB. However, the communication performance indicated by the performance index value data is not limited to traffic amount and latency.

The monitor 72 outputs the performance index value data generated by the above-mentioned enrichment to the data bus 68.

In this embodiment, for example, the data bus 68 receives the performance index value data output from the monitor 72. Based on the received one or a plurality of pieces of performance index value data, the data bus 68 generates a performance index value file including the one or a plurality of pieces of performance index value data. The data bus 68 then outputs the generated performance index value file to the big-data platform 66.

Further, the elements such as the network slice, the NS, the NF, the CNFC that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file in which alert message data indicating one or a plurality of notifications are compiled into one file, and outputs the generated alert file to the big-data platform 66.

In this embodiment, the big-data platform 66 accumulates, for example, the performance index value file and the alert file that have been output from the data bus 68.

In this embodiment, for example, a plurality of trained machine learning models are stored in the AI 70 in advance. The AI 70 uses various machine learning models stored in the AI 70 to execute an estimation process such as a future prediction process for a use status and quality of service of the communication system 1. The AI 70 may generate estimation result data indicating results of the estimation process.

The AI 70 may execute the estimation process based on the files accumulated in the big-data platform 66 and the above-mentioned machine learning model. This estimation process is suitable when prediction of a long-term trend is performed infrequently.

Further, the AI 70 can acquire performance index value data stored in the data bus 68. The AI 70 may execute the estimation process based on the performance index value data stored in the data bus 68 and the above-mentioned machine learning model. This estimation process is suitable when short-term predictions are performed frequently.

In this embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value relating to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. Further, the performance manager 88 may acquire estimation result data from the AI 70. A performance index value such as a KPI may be calculated based on at least one of the performance index value file or the estimation result data. The performance manager 88 may directly acquire metric data from the monitor 72. Further, the performance index value such as a KPI may be calculated based on the metric data.

In this embodiment, the failure manager 86 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may directly acquire the metric data and the notification of the alert from the monitor 72. The failure manager 86 may also acquire the performance index value file and the alert file from the big-data platform 66. Further, the failure manager 86 may acquire the alert message data from data bus 68.

In this embodiment, the policy manager 90 executes a predetermined determination process based on, for example, at least any one of the above-mentioned metric data, the above-mentioned performance index value data, the above-mentioned alert message data, the above-mentioned performance index value file, the above-mentioned alert file, the above-mentioned estimation result data, the above-mentioned Comprehensive performance index value data, or the above-mentioned detection failure data.

Then, the policy manager 90 may execute an action corresponding to a result of the determination process. For example, the policy manager 90 may output an instruction to construct a network slice to the slice manager 92. The policy manager 90 may also output an instruction for scaling or replacement of the elements to the life cycle manager 94 based on the result of the determination process.

The policy manager 90 in this embodiment can acquire the performance index value data stored in the data bus 68. The policy manager 90 may then execute a predetermined determination process based on the performance index value data acquired from the data bus 68. The policy manager 90 may also execute a predetermined determination process based on the alert message data stored in the data bus 68.

In this embodiment, the ticket manager 84 generates, for example, a ticket indicating information to be notified to an administrator of the communication system 1. The ticket manager 84 may generate a ticket indicating details of the detection failure data. The ticket manager 84 may also generate a ticket indicating a value of the performance index value data or the metric data. The ticket manager 84 may also generate a ticket indicating a determination result obtained by the policy manager 90.

Then, the ticket manager 84 notifies the administrator of the communication system 1 of the generated ticket. The ticket manager 84 may send, for example, an email to which the generated ticket is attached to an email address of the administrator of the communication system 1.

In this embodiment, for example, the bare metal manager 96 executes a setup, such as a basic input output system (BIOS) setting, a single root I/O virtualization (SR-IOV) setting, and installation and replacement of system software.

Further, in this embodiment, the configuration manager 76 may execute a hardware or software setting (configuration) on a hardware resource, such as a cluster ID setting, an IP address setting, a host name setting, or a label setting.

Further, the bare metal manager 96 may execute a setup corresponding to a predetermined type of application on the hardware resource.

For example, the configuration manager 76 or the bare metal manager 96 may store a script (for example, Ansible script) for setting up a predetermined type of application. The script may describe, for example, a procedure for installing a specific type or specific version of a host OS, which is the platform of the container execution environment. Further, the script may describe, for example, a kernel setting procedure of the host OS, a BIOS setting procedure, an SR-IOV setting procedure, and the like.

Through execution of the script, the bare metal manager 96 may execute, on a hardware resource, a setup corresponding to the type of the application operating in the hardware resource. For example, the bare metal manager 96 may execute a setup of the host OS of the container execution environment and the BIOS on the hardware resource.

The bare metal manager 96 may also replace system software such as the OS installed in the hardware resource. That is, the bare metal manager 96 may uninstall system software installed in a hardware resource and install different system software in the hardware resource.

Management of the hardware resources included in the communication system 1 in this embodiment is now described in further detail.

Figure 7:
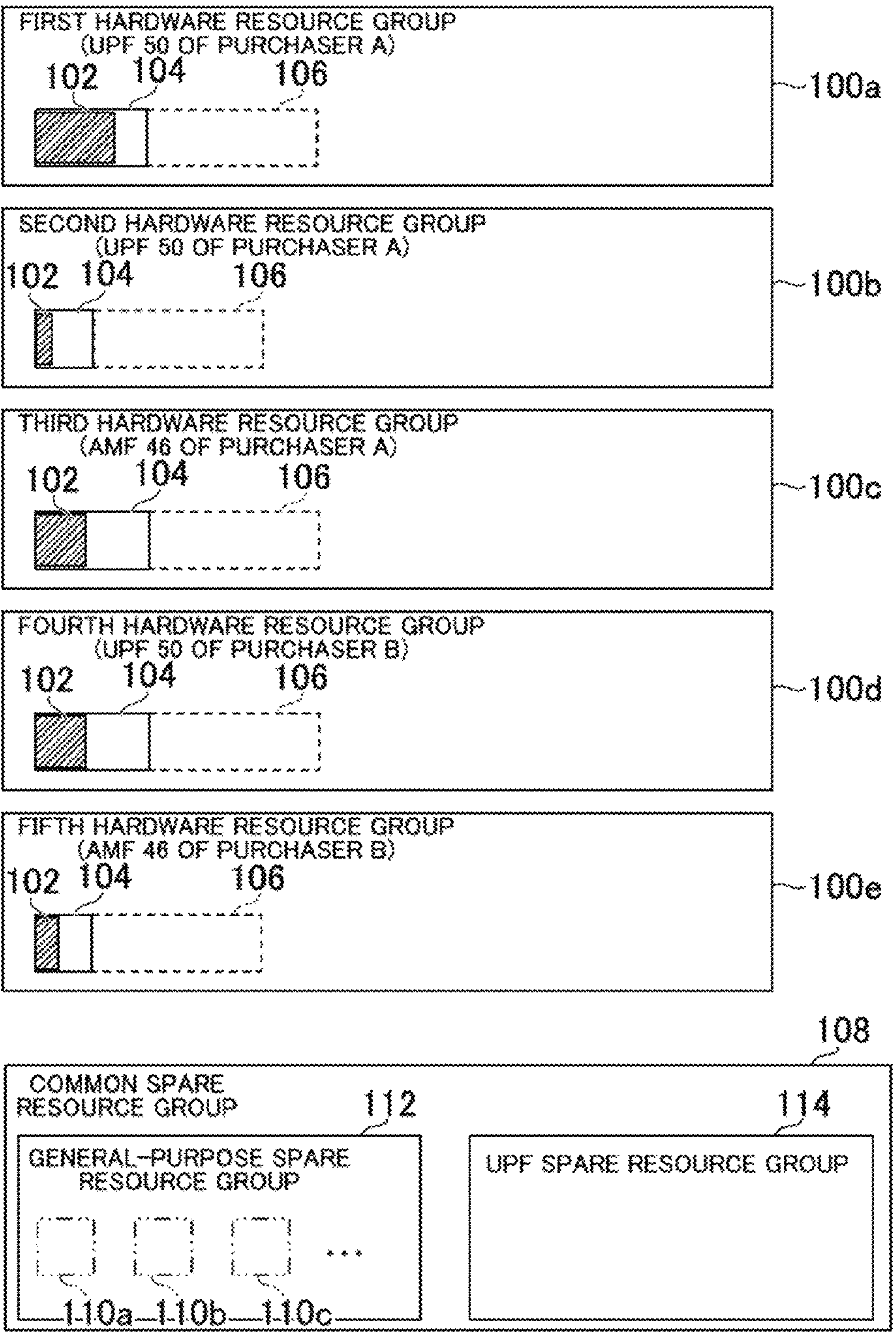
FIG. 7 is a diagram for schematically illustrating an example of allocation of hardware resources included in the communication system in the one embodiment of the present invention.

FIG. 7 is a diagram for schematically illustrating an example of allocation of hardware resources included in the communication system 1 in this embodiment.

There is now assumed a case in which, for example, two purchasers (purchaser A and purchaser B) have purchased a network service. In FIG. 7, a first hardware resource group 100*a* and a second hardware resource group 100*b* in which the UPF 50 included in the network service purchased by the purchaser A is operating are illustrated. Thus, in this embodiment, one type of NF included in the network service purchased by one purchaser may be arranged in a plurality of hardware resource groups 100. In this case, the hardware resource group 100 may include a server group.

Further, in FIG. 7, a third hardware resource group 100*c* in which the AMF 46 included in the network service purchased by the purchaser A is operating is illustrated.

Further, in FIG. 7, there are illustrated a fourth hardware resource group 100*d* in which the UPF 50 included in the network service purchased by the purchaser B is operating, and a fifth hardware resource group 100*e* in which the AMF 46 included in the network service purchased by the purchaser B is operating.

The network service purchased by the purchaser A or the purchaser B includes NFs which are not illustrated in FIG. 7 (for example, DUs 42, CUs 44, and SMFs 48), but those NEs are omitted.

As illustrated in FIG. 7, the hardware resources included in the communication system 1 in this embodiment are managed by dividing the hardware resources into a plurality of hardware resource groups 100. For example, a plurality of servers included in the communication system 1 are managed by dividing the plurality of servers into a plurality of server groups.

Further, as illustrated in FIG. 7, the type of the application which operates in each of the plurality of hardware resource groups 100 may be determined in advance. In the example of FIG. 7, it is determined in advance that the UPF 50 operates in the first hardware resource group 100*a*, the second hardware resource group 100*b*, and the fourth hardware resource group 100*d*, and it is determined in advance that the AMF 46 operates in the third hardware resource group 100*c* and the fifth hardware resource group 100*e*.

Further, as illustrated in FIG. 7, the application purchased by a purchaser different from the purchaser of the application operating in any one of the plurality of hardware resource groups 100 may be operating in another hardware resource group 100. In the example of FIG. 7, the application purchased by the purchaser A operates in the first hardware resource group 100*a*, the second hardware resource group 100*b*, and the third hardware resource group 100*c*. Further, the application purchased by the purchaser B operates in the fourth hardware resource group 100*d* and the fifth hardware resource group 100*e*.

The above-mentioned hardware resources are not limited to servers. Further, the location of the hardware resources illustrated in FIG. 7 is not particularly limited. In the following description, it is assumed that the hardware resources illustrated in FIG. 7 are arranged in the central data center 10, but those hardware resources may be arranged in the regional data center 12 or the edge data center 14.

In the following description, one hardware resource group 100 (for example, server group) corresponds to one cluster (for example, one Kubernetes cluster) managed by a container management tool. However, it is not required that one hardware resource group 100 correspond to one cluster managed by a container management tool. For example, one cluster managed by a container management tool may include a plurality of hardware resource groups 100. In this case, for example, one hardware resource group 100 may correspond to one namespace.

In this embodiment, for example, the monitor 72 monitors a usage status of each of the plurality of hardware resource groups 100 included in the communication system 1. In this case, for example, the monitor 72 may monitor the usage status of each of the plurality of server groups included in the communication system 1.

The usage status of the hardware resource group 100 refers to, for example, a CPU usage rate, a memory usage amount, a storage usage amount, and a network usage amount. Further, a comprehensive evaluation value calculated based on a part or all of the indices monitored for a hardware resource group may be monitored as a value indicating the usage status of the hardware resource group 100.

In this embodiment, for example, as described above, scaling (scale-out and scale-in) of applications such as the NFs is executed based on performance index values such as traffic amount and latency. Accordingly, the number of applications operating in one hardware resource group 100 fluctuates as appropriate in accordance with the scaling.

Further, in this embodiment, for example, a maximum hardware resource amount estimated to be used for operation of the applications in the hardware resource group 100 can be identified based on the number of applications operating in one hardware resource group 100. For example, data indicating the maximum hardware resource amount per application may be stored in the configuration manager 76 for each type of application. Based on the data, the configuration manager 76 may identify, for each of the plurality of hardware resource groups 100 (for example, plurality of server groups), the maximum hardware resource amount estimated to be used for the operation of the applications. Accordingly, the maximum hardware resource amount estimated to be used for operation of the applications may be proportional to the number of applications operating in the hardware resource group 100.

In FIG. 7, the hardware resource amount allocated to each hardware resource group 100 is schematically illustrated. Further, in FIG. 7, an actually used resource amount 102, an estimated maximum usage resource amount 104, and a standby resource amount 106, which are each a part of the hardware resource amount allocated to the hardware resource group 100, are also illustrated.

The actually used resource amount 102 corresponds to the hardware resource amount actually used by the applications operating in the hardware resource group 100.

The estimated maximum resource usage amount 104 corresponds to the above-mentioned maximum hardware resource amount estimated to be used for operation of the applications. In this embodiment, even when the number of applications operating in the hardware resource group 100 does not change, the actual usage amount of the hardware resources fluctuates as appropriate. Thus, as illustrated in FIG. 7, the actually used resource amount 102 is smaller than the estimated maximum usage resource amount 104.

The standby resource amount 106 corresponds to the hardware resource amount obtained by subtracting the estimated maximum usage resource amount 104 from the hardware resource amount allocated to the hardware resource group 100.

In this embodiment, when an application operating in the hardware resource group 100 is scaled out, the estimated maximum usage resource amount 104 increases and the standby resource amount 106 decreases by the increased amount of the estimated maximum usage resource amount 104.

The hardware resource amount allocated to the hardware resource group 100 (that is, the sum of the estimated maximum usage resource amount 104 and the standby resource amount 106) may be specified by the purchaser, for example, when the purchaser purchases the network service. For example, more hardware resources may be allocated to the hardware resource group 100 when the network service purchased by the purchaser has a higher purchase cost. Further, in this embodiment, the purchaser may be able to add or delete hardware resources allocated to the hardware resource group 100 as appropriate.

Further, in the communication system 1 in this embodiment, a common spare resource group 108 (for example, a common server group) different from all of the above-mentioned hardware resource groups 100 is managed. That is, in this embodiment, a hardware resource group different from the plurality of hardware resource groups 100 described above (for example, first hardware resource group 100*a* to fifth hardware resource group 100*e*) is managed as the common spare resource group 108.

As illustrated in FIG. 7, the common spare resource group 108 includes a plurality of spare resources 110 (110*a*, 110*b*, 110*c*, . . . ). One spare resource 110 corresponds to, for example, one or a plurality of servers.

As illustrated in FIG. 7, the common spare resource group 108 includes a general-purpose spare resource group 112 and one or a plurality of special spare resource groups (a UPF spare resource group 114 in the example of FIG. 7). That is, the general-purpose spare resource group 112 is a part of the common spare resource group 108. Further, the special spare resource group is a part of the common spare resource group 108.

The special spare resource group in this embodiment is associated with a type of application. For example, the UPF spare resource group 114 is associated with the UPF 50.

The hardware resources included in the special spare resource group are hardware resources on which a setup corresponding to the type of the application associated with the special spare resource group has been executed. For example, the hardware resources included in the UPF spare resource group 114 are hardware resources on which a setup corresponding to the UPF 50 has been executed.

Depending on the type of the application, there are cases in which general-purpose hardware resources (for example, general-purpose servers) cannot operate the application, and execution of a setup corresponding to the type is required. The hardware resources included in the special spare resource group can be said to have been set up in such a manner.

Meanwhile, the hardware resources included in the general-purpose spare resource group 112 are hardware resources not requiring additional execution of a setup corresponding to the type of the application in order to operate an application different from the type of the application associated with the special spare resource group. For example, the hardware resources included in the general-purpose spare resource group 112 are general-purpose servers.

In this embodiment, for example, as illustrated in FIG. 7, in an initial state, the general-purpose spare resource group 112 includes spare resources 110, but the UPF spare resource group 114 does not include a spare resource 110, and is empty.

In this embodiment, for example, the configuration manager 76 changes, in response to the usage status of any one of the hardware resource groups 100 satisfying a first condition (hereinafter referred to as "resource addition condition") associated with the hardware resource group 100, an affiliation of a hardware resource included in the common spare resource group 108 from the common spare resource group 108 to the hardware resource group 100. In this way, a hardware resource is added to the hardware resource group 100, and the amount of the hardware resource allocated to the hardware resource group 100 is increased.

In this case, the configuration manager 76 may change, in response to the usage status of any one of the server groups satisfying the condition associated with the server group, an affiliation of a server included in a common spare server group different from all of the server groups from the common spare server group to the any one of the server groups.

In this case, the configuration manager 76 may determine whether or not the type of the application operating in the hardware resource group 100 which has satisfied the resource addition condition is a predetermined type. For example, the configuration manager 76 may determine whether or not the type of the application operating in the hardware resource group 100 which has satisfied the resource addition condition is the type (for example, UPF 50) associated with the special spare resource group.

When the type of the application operating in the hardware resource group 100 which has satisfied the resource addition condition is the predetermined type, the configuration manager 76 determines whether or not a surplus level of the hardware resource which is included in the special spare resource group associated with the type satisfies a predetermined surplus condition.

The surplus level of the hardware resource corresponds to, for example, a hardware resource amount included in the special spare resource group, or whether or not the hardware resource is included in the special spare resource group. Further, the surplus condition corresponds to, for example, a condition that the hardware resource amount included in the special spare resource group is equal to or more than a predetermined amount, or a condition that the hardware resource included in the special spare resource group is present.

When the surplus condition is satisfied, the configuration manager 76 may change the affiliation of a hardware resource included in the special spare resource group from the special spare resource group to the hardware resource group 100.

Meanwhile, when the surplus condition is not satisfied, the bare metal manager 96 may execute a setup corresponding to the type of the application on a hardware resource included in the general-purpose spare resource group 112. The configuration manager 76 may then change the affiliation of the hardware resource on which the setup has been executed from the general-purpose spare resource group 112 to the hardware resource group 100.

In the case described above, the bare metal manager 96 may execute a setup corresponding to the type of the application operating in the hardware resource group 100 on the hardware resource (for example, the above-mentioned selected hardware resource) included in the common spare resource group 108 in response to the usage status of any one of the hardware resource groups 100 satisfying the resource addition condition associated with the hardware resource group 100.

For example, when the surplus level of a hardware resource included in the UPF spare resource 114 satisfies a predetermined surplus condition, the configuration manager 76 may change, in response to the usage status of any one of the hardware resource groups 100 in which the UPF 50 is operating satisfying the resource addition condition associated with the hardware resource group 100, the affiliation of the hardware resource included in the UPF spare resource group 114 from the UPF spare resource group 114 to the hardware resource group 100.

Further, for example, when the surplus level of the hardware resource included in the UPF spare resource group 114 does not satisfy the predetermined surplus condition, the bare metal manager 96 may execute a setup corresponding to the UPF 50 on the hardware resource included in the general-purpose spare resource group 112 in response to the usage status of any one of the hardware resource groups 100 in which the UPF 50 is operating satisfying the resource addition condition associated with the hardware resource group 100. The configuration manager 76 may then change the affiliation of the hardware resource on which the setup has been executed from the general-purpose spare resource group 112 to the hardware resource group 100.

Meanwhile, when the type of the application operating in the hardware resource group 100 which has satisfied the resource addition condition is a type other than the above-mentioned predetermined type, the configuration manager 76 may change the affiliation of the hardware resource included in the general-purpose spare resource group 112 from the general-purpose spare resource group 112 to the hardware resource group 100.

For example, the configuration manager 76 may change, in response to the usage status of any one of the hardware resource groups 100 in which the AMF 46 is operating satisfying the resource addition condition associated with the hardware resource group 100, the affiliation of the hardware resource included in the general-purpose spare resource group 112 from the general-purpose spare resource group 112 to the hardware resource group 100.

Further, in this embodiment, for example, the configuration manager 76 changes, in response to the usage status of any one of the hardware resource groups 100 satisfying a second condition (hereinafter referred to as "resource deletion condition") associated with the hardware resource group 100, an affiliation of a hardware resource which is a part of the hardware resource group 100 from the hardware resource group 100 to the common spare resource group 108. In this way, a hardware resource is deleted from the hardware resource group 100, and the amount of the hardware resource allocated to the hardware resource group 100 is decreased.

In this embodiment, in a case in which a spare resource 110 is not included in the hardware resources allocated to the hardware resource group 100, the hardware resource may not be deleted from the hardware resource group 100 even when the usage status of the hardware resource group 100 satisfies the resource deletion condition associated with the hardware resource group 100.

In this embodiment, for example, the configuration manager 76 changes the affiliation of the hardware resource by setting a cluster ID, an IP address, a host name, or a label.

In this case, the configuration manager 76 may identify the spare resource group associated with the type of the application operating in the hardware resource group 100 which has satisfied the resource deletion condition. The configuration manager 76 may then change the affiliation of the hardware resource, which is a part of the hardware resource group 100, from the hardware resource group 100 to the identified spare resource group.

For example, when the type of the application operating in the hardware resource group 100 which has satisfied the resource deletion condition is the above-mentioned predetermined type, the configuration manager 76 may change the affiliation of the hardware resource, which is a part of the hardware resource group 100, from the hardware resource group 100 to the special spare resource group associated with the type.

For example, when the type of the application operating in the hardware resource group 100 which has satisfied the resource deletion condition is the UPF 50, the configuration manager 76 may change the affiliation of the hardware resource, which is a part of the hardware resource group 100, from the hardware resource group 100 to the UPF spare resource group 114.

For example, when the type of the application operating in the hardware resource group 100 which has satisfied the resource deletion condition is a type other than the above-mentioned predetermined type, the configuration manager 76 may change the affiliation of the hardware resource, which is a part of the hardware resource group 100, from the hardware resource group 100 to the general-purpose spare resource group 112.

For example, when the type of the application operating in the hardware resource group 100 which has satisfied the resource deletion condition is the AMF 46, the configuration manager 76 may change the affiliation of the hardware resource, which is a part of the hardware resource group 100, from the hardware resource group 100 to the general-purpose spare resource group 112.

Figure 8:
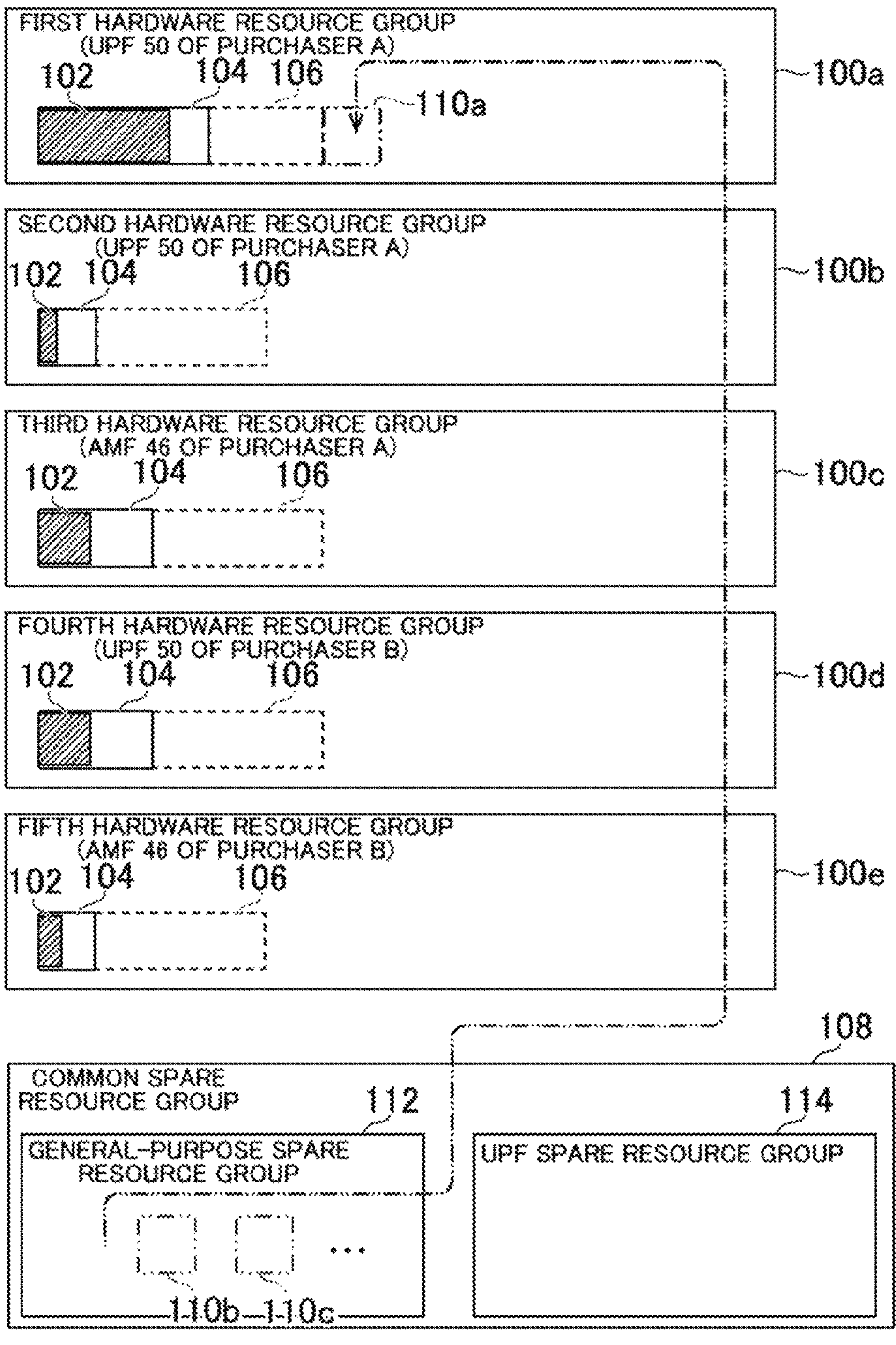
FIG. 8 is a diagram for schematically illustrating an example of allocation of the hardware resources included in the communication system in the one embodiment of the present invention.

For example, as illustrated in FIG. 8, it is assumed that a proportion of the actually used resource amount 102 with respect to the hardware resource amount allocated to the first hardware resource group 100*a* exceeds a predetermined proportion p1.

In this case, the type of the application operating in the first hardware resource group 100*a* is the UPF 50.

Thus, the configuration manager 76 determines whether or not the surplus level of the hardware resource included in the UPF spare resource group 114 satisfies a predetermined surplus condition.

For example, it is assumed that the surplus condition is the condition that the hardware resource included in the special spare resource group is present. In this case, because the UPF spare resource group 114 is empty, the surplus condition is not satisfied.

Thus, for example, the bare metal manager 96 executes a setup corresponding to the UPF 50 on one spare resource 110 (hereinafter referred to as "selected hardware resource") selected from the general-purpose spare resource group 112. In this case, for example, the spare resource 110*a* corresponds to the selected hardware resource. Then, for example, the configuration manager 76 changes the affiliation of the selected hardware resource on which the setup has been executed from the general-purpose spare resource group 112 to the first hardware resource group 100*a*.

Figure 9:
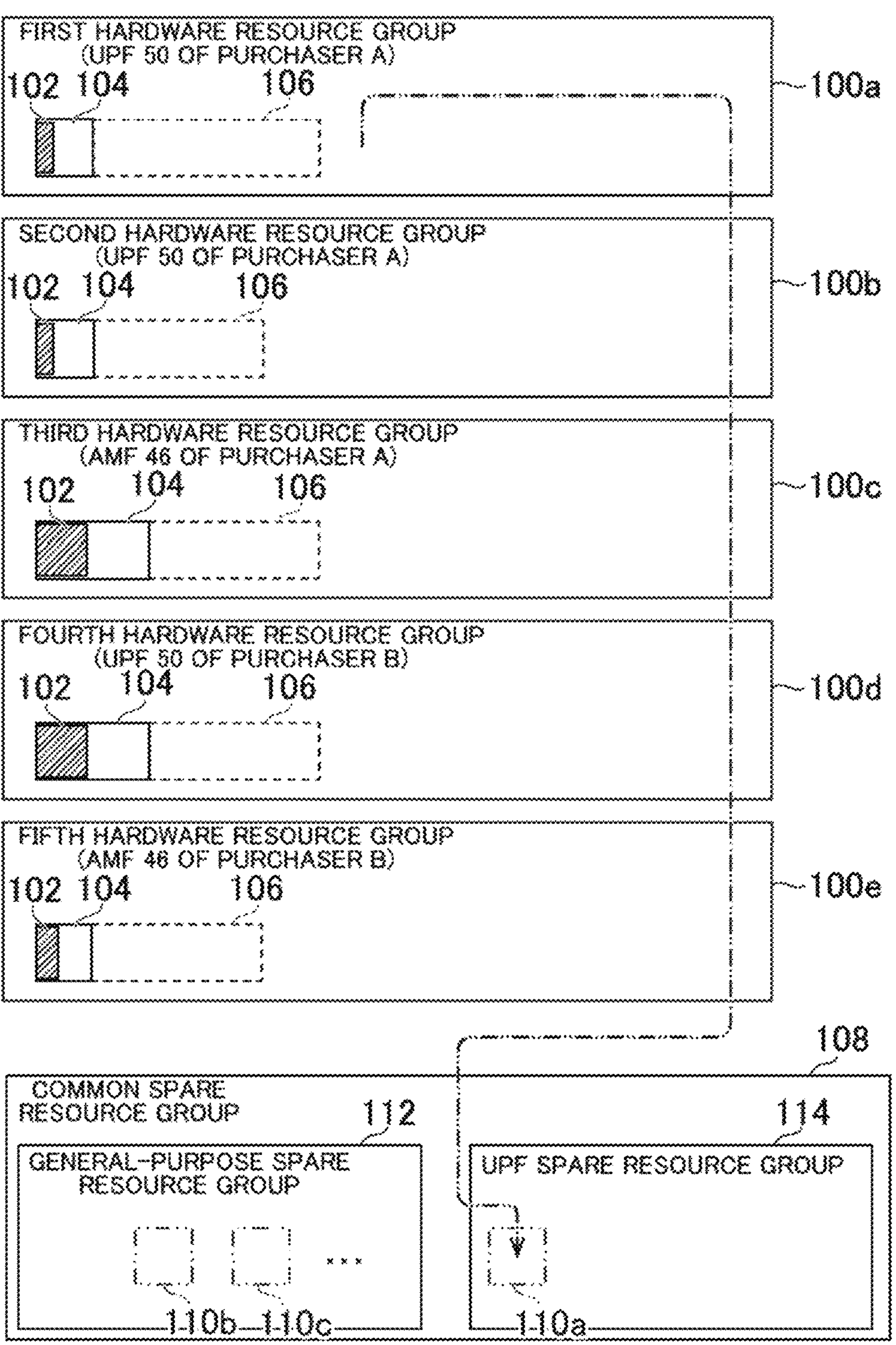
FIG. 9 is a diagram for schematically illustrating an example of allocation of the hardware resources included in the communication system in the one embodiment of the present invention.

Further, as illustrated in FIG. 9, it is assumed that the proportion of the actually used resource amount 102 with respect to the hardware resource amount allocated to the first hardware resource group 100*a* is less than a predetermined proportion p2. The value of p2 may be a value smaller than p1.

In this case, the type of the application operating in the first hardware resource group 100*a* is the UPF 50.

Accordingly, for example, the configuration manager 76 changes the affiliation of the selected hardware resource described above from the first hardware resource group 100*a* to the UPF spare resource group 114.

Figure 10:
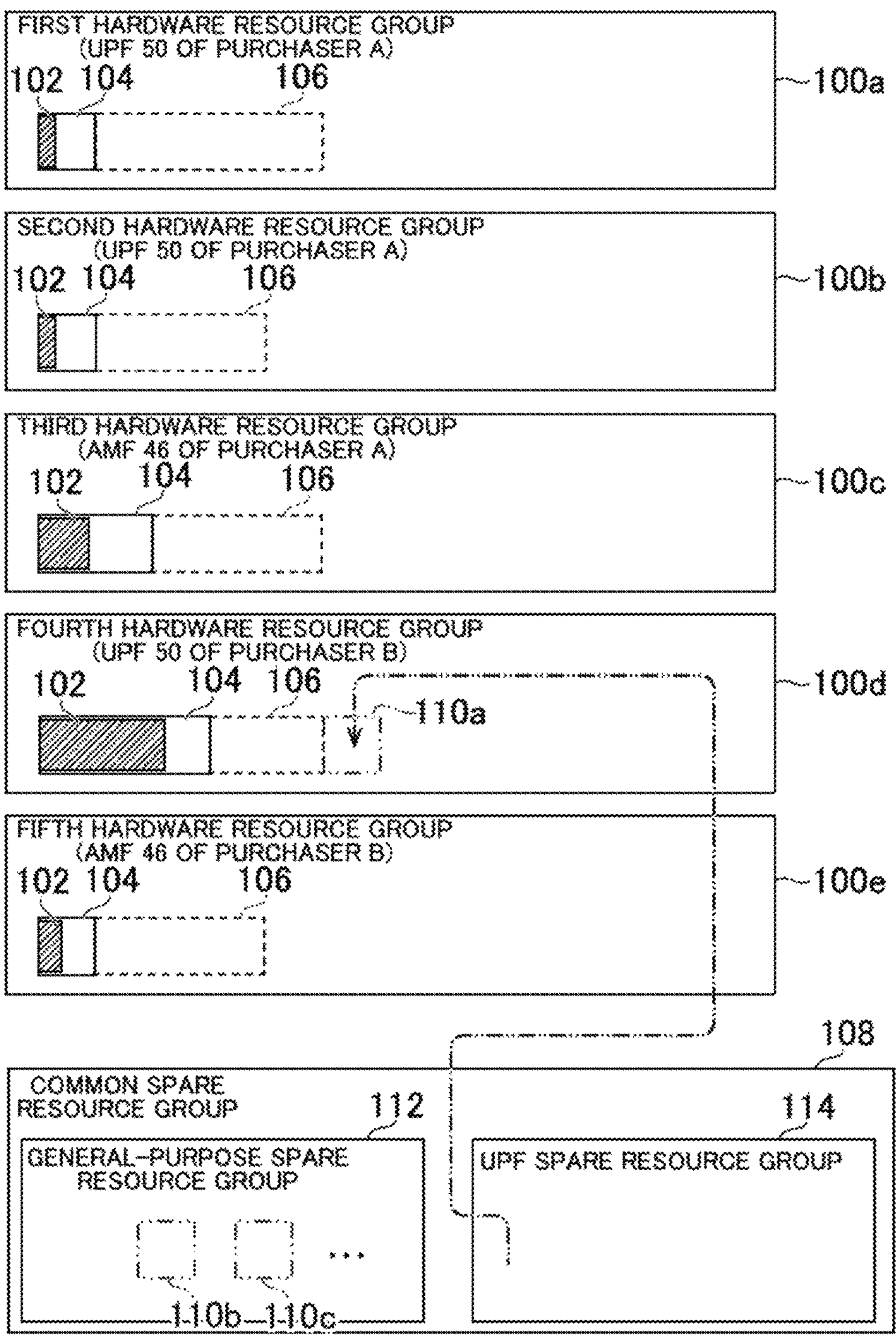
FIG. 10 is a diagram for schematically illustrating an example of allocation of the hardware resources included in the communication system in the one embodiment of the present invention.

Moreover, as illustrated in FIG. 10, it is assumed that the proportion of the actually used resource amount 102 with respect to the hardware resource amount allocated to the fourth hardware resource group 100*d* then exceeds a predetermined proportion p3. In this case, the value of p3 may be the same as or different from the value of p1.

In this case, the type of the application operating in the fourth hardware resource group 100*d* is the UPF 50.

Thus, the configuration manager 76 determines whether or not the surplus level of the hardware resource included in the UPF spare resource group 114 satisfies a predetermined surplus condition.

In the situation illustrated in FIG. 9, the UPF spare resource group 114 is not empty, and hence the surplus condition is satisfied.

As a result, for example, the bare metal manager 96 changes the affiliation of one spare resource 110 (which may be the above-mentioned selected hardware resource) selected from the UPF spare resource group 114 from the UPF spare resource group 114 to the fourth hardware resource group 100*d*.

In this way, the configuration manager 76 may change the affiliation of the hardware resource for which the affiliation has been changed from the first hardware resource group 100*a* to the common spare resource group 108 from the common spare resource group 108 to the fourth hardware resource group 100*d* in response to the usage status of the fourth hardware resource group 100*d* satisfying the resource addition condition associated with the fourth hardware resource group 100*d*.

As a result, the spare resource 110 used by a certain hardware resource group 100 can be used by another hardware resource group 100.

Further, as described above, the configuration manager 76 may change the affiliation of the selected hardware resource selected from among the common spare resource group 108 from the common spare resource group 108 to the first hardware resource group 100*a* in response to the usage status of the first hardware resource group 100*a* satisfying the resource addition condition associated with the first hardware resource group 100*a*.

In addition, the configuration manager 76 may change the affiliation of the selected hardware resource from the first hardware resource group 100*a* to the common spare resource group 108 in response to the usage status of the first hardware resource group 100*a* satisfying the resource deletion condition associated with the first hardware resource group 100*a*.

In addition, the configuration manager 76 may change the affiliation of the selected hardware resource for which the affiliation has been changed from the first hardware resource group 100*a* to the common spare resource group 108 from the common spare resource group 108 to the fourth hardware resource group 100*d* in response to the usage status of the fourth hardware resource group 100*d* satisfying the resource addition condition associated with the fourth hardware resource group 100*d*.

In this way, a specific spare resource 110 (selected hardware resource) can be used in a plurality of hardware resource groups 100 one after the other.

The resource addition condition and the resource deletion condition may each be a condition relating to the actual usage amount of the hardware resource or the actual usage rate of the hardware resource. For example, the resource addition condition and the resource deletion condition may each be a threshold value relating to the actually used resource amount 102.

Further, the resource addition condition and the resource deletion condition may each be a condition relating to an actual surplus amount of the hardware resource or an actual surplus rate of the hardware resource. The actual surplus amount of the hardware resource corresponds to, for example, the hardware resource amount obtained by subtracting the actually used resource amount 102 from the hardware resource amount allocated to the hardware resource group 100. The actual spare rate of the hardware resource corresponds to, for example, the proportion of the hardware resource amount obtained by used resource amount 102 from the subtracting the actually hardware resource amount allocated to the hardware resource group 100 with respect to the hardware resource amount allocated to the hardware resource group 100. The calculation of the surplus amount and surplus rate may be performed by applying a weighting, or an additional calculation may be performed on the calculated value, such as further applying a weighting. Moreover, for example, the resource addition condition and the resource deletion condition may each be a condition relating to a value obtained by subtracting the actually used resource amount 102 from the hardware resource amount allocated to the hardware resource group 100.

Further, the resource addition condition and the resource deletion condition may each be a condition relating to a maximum hardware resource amount estimated to be used for operation of the application in the hardware resource group 100, or a maximum hardware resource rate estimated to be used for operation of the application in the hardware resource group 100. That is, the resource addition condition and the resource deletion condition may each be a condition relating to the estimated maximum usage resource amount 104. For example, the affiliation of the hardware resource included in the common spare resource group 108 may be changed from the common spare resource group 108 to the hardware resource group 100 in response to the estimated maximum usage resource amount 104 exceeding a predetermined threshold value.

Further, the resource addition condition and the resource deletion condition may each be a condition associated with the number of applications operating in the hardware resource group 100. For example, the affiliation of the hardware resources included in the common spare resource group 108 may be changed from the common spare resource group 108 to the hardware resource group 100 in response to the number of applications operating in the hardware resource group 100 increasing to three due to scale-out. Further, the affiliation of the hardware resources included in the hardware resource group 100 may be changed from the hardware resource group 100 to the common spare resource group 108 in response to the number of applications operating in the hardware resource group 100 decreasing to one due to scale-in.

In the case of managing the hardware resources included in the communication system 1 by dividing the hardware resources into the plurality of hardware resource groups 100, when a large number of the hardware resources of each of the plurality of hardware resource groups 100 are reserved in advance in anticipation of an application being scaled out, some of those hardware resource may be wasted.

In this embodiment, as described above, in response to the usage status of a hardware resource group 100 satisfying the condition associated with the hardware resource group 100, the affiliation of the hardware resource included in the common spare resource group 108 is changed from the common spare resource group 108 to the hardware resource group 100.

In this way, according to this embodiment, it is possible to efficiently use hardware resources included in the communication system 1.

Further, the time required to change the affiliation of the spare resource 110 from the common spare resource group 108 to the hardware resource group 100 due to scale-out and then deploy the application to the spare resource 110 is longer than the time required to deploy the application to the hardware resource already allocated to the hardware resource group 100 due to scale-out. Thus, in order to perform scale-out smoothly, it is desired that as many hardware resources as possible be constantly secured for the hardware resource group 100.

However, in a situation in which the amount paid by the purchaser increases as the hardware resource amount allocated to the hardware resource group 100 increases, it is desired that the hardware resource amount constantly secured for the hardware resource group 100 be as small as possible.

On the other hand, when the load suddenly increases due to an unforeseen circumstance, or when an event in which many people are to gather is scheduled to be held, it may not be possible to provide a sufficient service by using only the hardware resources secured for the hardware resource group 100.

In this embodiment, as described above, the hardware resources secured for the hardware resource group 100 can be flexibly adjusted by temporarily adding the spare resource 110 to the hardware resource group 100, and hence it becomes possible to provide a sufficient service even in the above-mentioned cases, for example.

When the hardware resource group 100 corresponds to a cluster managed by a container management in this embodiment, it is possible to change the affiliation of a spare resource 110 straddling clusters which cannot be changed by using the container management tool.

Further, in this embodiment, as described above, when the surplus level of a hardware resource included in a special spare resource group satisfies a predetermined surplus condition, the configuration manager 76 may change, in response to the usage status of any one of the hardware resource groups 100 in which the type of the application associated with the special spare resource group is operating satisfying the resource addition condition associated with the hardware resource group 100, the affiliation of the hardware resource included in the special spare resource group from the special spare resource group to the hardware resource group 100.

Further, when the surplus level of the hardware resource included in the special spare resource group does not satisfy the above-mentioned surplus condition, the bare metal manager 96 may execute, in response to the usage status of any one of the hardware resource groups 100 in which the type of the application associated with the special spare resource group is operating satisfying the resource addition condition associated with the hardware resource group 100, a setup corresponding to the type on the hardware resource included in the general-purpose spare resource group 112, and the configuration manager 76 may change the affiliation of the hardware resource on which the setup has been executed from the general-purpose spare resource group 112 to the hardware resource group 100.

As a result, in a case in which the usage status of the hardware resource group 100 in which the above-mentioned predetermined type of application is operating satisfies the resource addition condition, when there is a spare hardware resource on which the setup corresponding to the type has been executed, it is possible to smoothly add the spare resource 110 to the hardware resource group 100 without executing the setup on a hardware resource on which the setup has not been executed.

Further, in the initial state, even when the setup corresponding to the above-mentioned predetermined type of application has not been executed on the spare resource 110 in advance, the spare resource 110 can be added to the hardware resource group 100 in which the application of that type is operating.

Further, as described above, when the surplus level of the hardware resource included in the special spare resource group does not satisfy the surplus condition, the bare metal manager 96 may execute, in response to the usage status of any one of the hardware resource groups 100 in which the type of the application associated with the special spare resource group is operating satisfying the resource addition condition associated with the hardware resource group 100, a setup corresponding to the type on the selected hardware resource selected from the general-purpose spare resource group 112, and the configuration manager 76 may change the affiliation of the selected hardware resource on which the setup has been executed from the general-purpose spare resource group 112 to the hardware resource group 100.

Further, in response to the usage status of the hardware resource group 100 satisfying the resource deletion condition associated with the resource hardware group 100, the configuration manager 76 may change the affiliation of the selected hardware resource on which the above-mentioned setup has been executed from the hardware resource group 100 to the special spare resource group.

In this way, by changing the affiliation of a hardware resource for which the affiliation has been changed from the general-purpose spare resource group 112 to the hardware resource group 100 and on which the above-mentioned setup has been executed to not the general-purpose spare resource group 112 but the special spare resource group, without returning the state of the hardware resource to the state of before the execution of the setup, it is possible to improve the durability of the hardware resource because the number of read and write times of the storage can be reduced, for example.

The present invention is also applicable to a hardware resource group 100 in which another application (for example, SMF 48) included in the core network system 34 is operating.

The present invention is also applicable to a hardware resource group 100 in which applications (for example, DUs 42, CU-CPs 44*a*, and CU-UPs 44*b*) included in the RAN 32 are operating.

Further, the resource addition condition and the resource deletion condition may each be a condition associated with the type of the application operating in the hardware resource group 100. For example, when the resource addition condition is a threshold value relating to the proportion of the actually used resource amount 102 with respect to the hardware resource amount allocated to the hardware resource group 100, the resource addition condition may be set such that the threshold value becomes smaller as the application has a larger estimated maximum usage resource amount 104 which increases due to scale-out.

Further, the configuration manager 76 may change the affiliation of the hardware resource included in the common spare resource group 108 from the common spare resource group 108 to the hardware resource group 100 in response to the usage status of the hardware resource group 100 satisfying the resource addition condition associated with the type of the application operating in the hardware resource group 100.

Further, the configuration manager 76 may change the affiliation of the hardware resource included in the hardware resource group 100 from the hardware resource group 100 to the Common spare resource group 108 in response to the usage status of the hardware resource group 100 satisfying the resource deletion condition associated with the type of the application operating in the hardware resource group 100.

For example, for the first hardware resource group 100*a*, the second hardware resource group 100*b*, and the fourth hardware resource group 100*d* in which the UPF 50 is operating, at least one of the resource addition condition or the resource deletion condition may be the same. Further, for the third hardware resource group 100*c* and the fifth hardware resource group 100*e* in which the AMF 46 is operating, at least one of the resource addition condition or the resource deletion condition may be the same.

Through association of the resource addition condition or the resource deletion condition with the type of the application in this way, for each of a plurality of types of applications, hardware resources can be added or deleted at a timing suited to the type of the application.

The purchaser of the application may be able to set the resource addition condition or the resource deletion condition.

Further, for example, the resource addition condition or the resource deletion condition may each be a condition selected by the purchaser of the application operating in the hardware resource group 100 from a range associated with the type of the application, or is a condition selected by the purchaser of the application operating in the hardware resource group 100 from among a plurality of options associated with the type of the application. In this way, the purchaser of the application can set the resource addition condition or the resource deletion condition, and at the same time, can provide a limit associated with the type of the application for the setting.

Further, in this embodiment, the hardware resource amount of the spare resource 110 for which the affiliation is to be changed from the common spare resource group 108 to the hardware resource group 100 may correspond to the hardware resource amount allocated to the hardware resource group 100. For example, as more hardware resources are allocated to the hardware resource group 100, the affiliations of more spare resources 110 may be changed.

Further, the addition of the spare resource 110 to the hardware resource group 100 (change of affiliation from the common spare resource group 108 to the hardware resource group 100) may be executed a plurality of times. That is, after one spare resource 110 is added to the hardware resource group 100, another one spare resource 110 may be added to the hardware resource group 100 in response to the usage status of the hardware resource group 100 satisfying the resource addition condition. In this case, the resource addition condition may be a condition corresponding to the number of spare resources 110 added to the hardware resource group 100.

Further, in this embodiment, the common spare resource group 108 may include a plurality of special spare resource groups. Each of the plurality of special spare resource groups may be associated with an application type. Further, each of the plurality of special spare resource groups may include hardware resources on which a setup corresponding to the type of the application associated with the special spare resource group has been executed.

In addition, when the surplus level of a hardware resource included in any one of the special spare resource groups satisfies a surplus condition associated with the special spare resource group, the configuration manager 76 may change, in response to the usage status of the hardware resource group 100 in which the application associated with the special spare resource group is operating satisfying the resource addition condition associated with the hardware resource group 100, the affiliation of the hardware resource included in the special spare resource group from the special spare resource group to the hardware resource group 100.

Now, a situation in which a plurality of special spare resource groups are included in the common spare resource group 108 is described with reference to FIG. 11 to FIG. 17.

Figure 11:
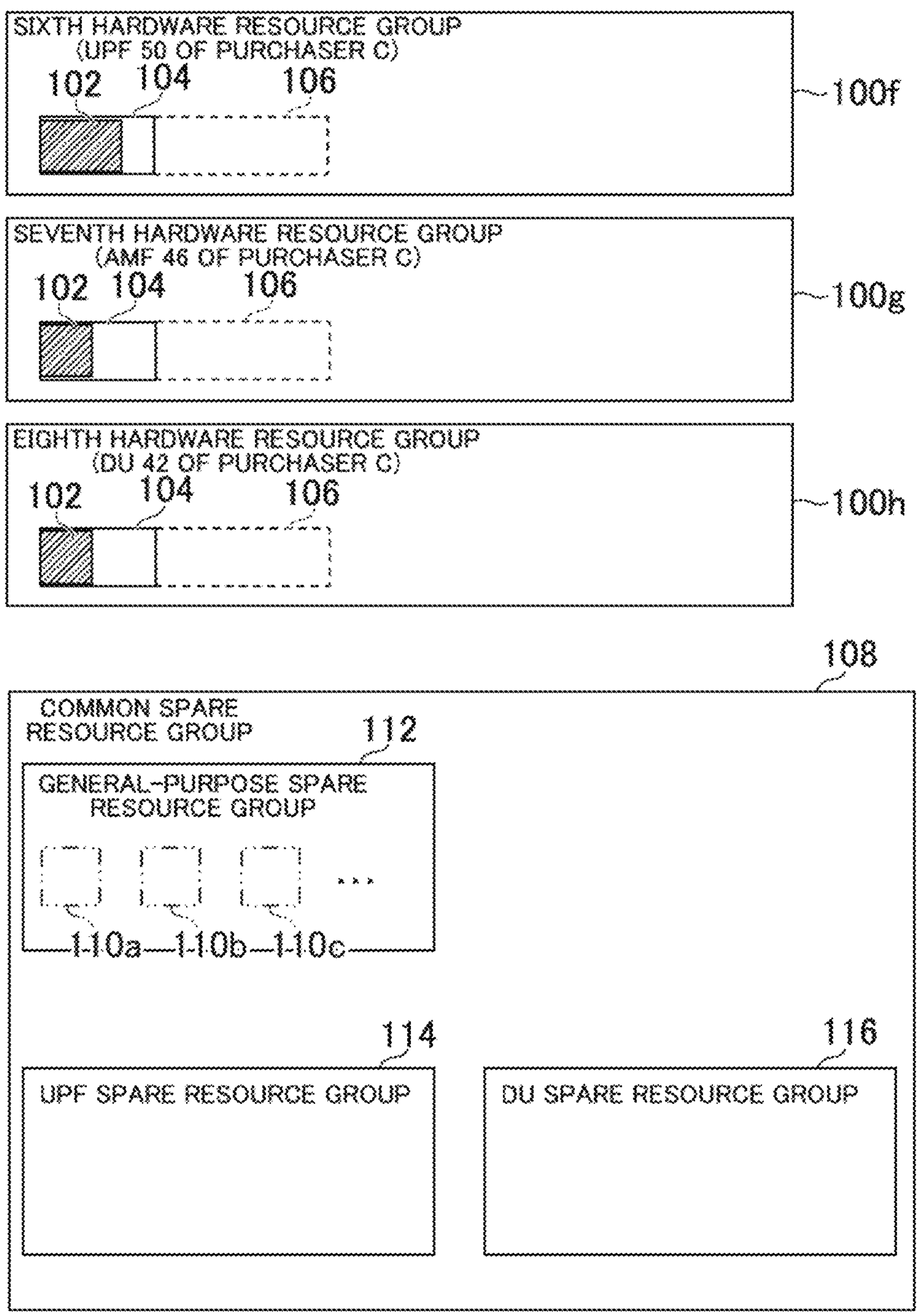
FIG. 11 is a diagram for schematically illustrating an example of allocation of the hardware resources included in the communication system in the one embodiment of the present invention.

In the following description, as illustrated in FIG. 11, it is assumed that a UPF 50 purchased by a purchaser C is operating in a sixth hardware resource group 100*f*, an AMF 46 purchased by the purchaser C is operating in a seventh hardware resource group 100*g*, and a DU 42 purchased by the purchaser C is operating in an eighth hardware resource group 100*h*.

The network service purchased by the purchaser C includes NEs which are not illustrated in FIG. 11 (for example, CUs 44 and SMFs 48), but those NEs are omitted.

Further, it is assumed that the common spare resource group 108 includes the general-purpose spare resource group 112 and two special spare resource groups (UPF spare resource group 114 and DU spare resource group 116).

It is assumed that the hardware resources included in the UPF spare resource group 114 are hardware resources on which a setup corresponding to the UPF 50 has been executed.

Further, it is assumed that the hardware resources included in the DU spare resource group 116 are hardware resources on which a setup corresponding to the DU 42 has been executed.

Further, as described above, it is assumed that the hardware resources included in the general-purpose spare resource group are 112 resources hardware not requiring additional execution of a setup corresponding to the type of the application in order to operate an application different from the type of the application associated with the special spare resource group. For example, the hardware resources included in the general-purpose spare resource group 112 are general-purpose servers.

As illustrated in FIG. 11, it is assumed that, in an initial state, the general-purpose spare resource group 112 includes spare resources 110 (110*a*, 110*b*, 110*c*, . . . ), but the UPF spare resource group 114 and the DU spare resource group 116 do not include a spare resource 110, and are empty.

Figure 12:
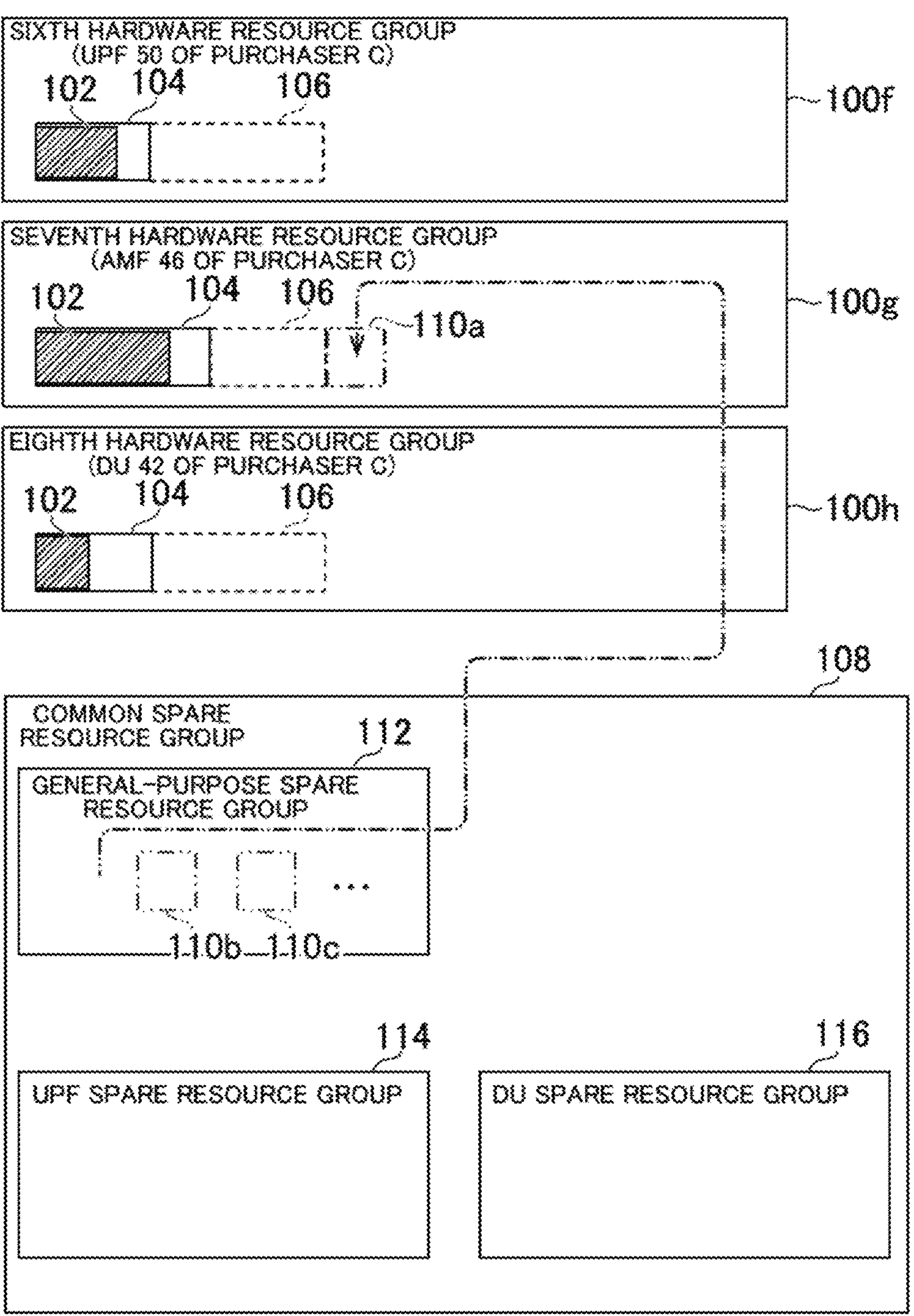
FIG. 12 is a diagram for schematically illustrating an example of allocation of the hardware resources included in the communication system in the one embodiment of the present invention.

It is assumed that, in the situation illustrated in FIG. 11, for example, as illustrated in FIG. 12, the usage status of the seventh hardware resource group 100*g* in which the AMF 46 is operating satisfies the resource addition condition.

In this case, the configuration manager 76 may change the affiliation of a selected hardware resource, which is a spare resource 110 selected from the general-purpose spare resource group 112, from the common spare resource group 108 to the seventh hardware resource group 100*g* without executing a special setup for the selected hardware resource. In this case, for example, the spare resource 110*a* corresponds to the selected hardware resource.

Figure 13:
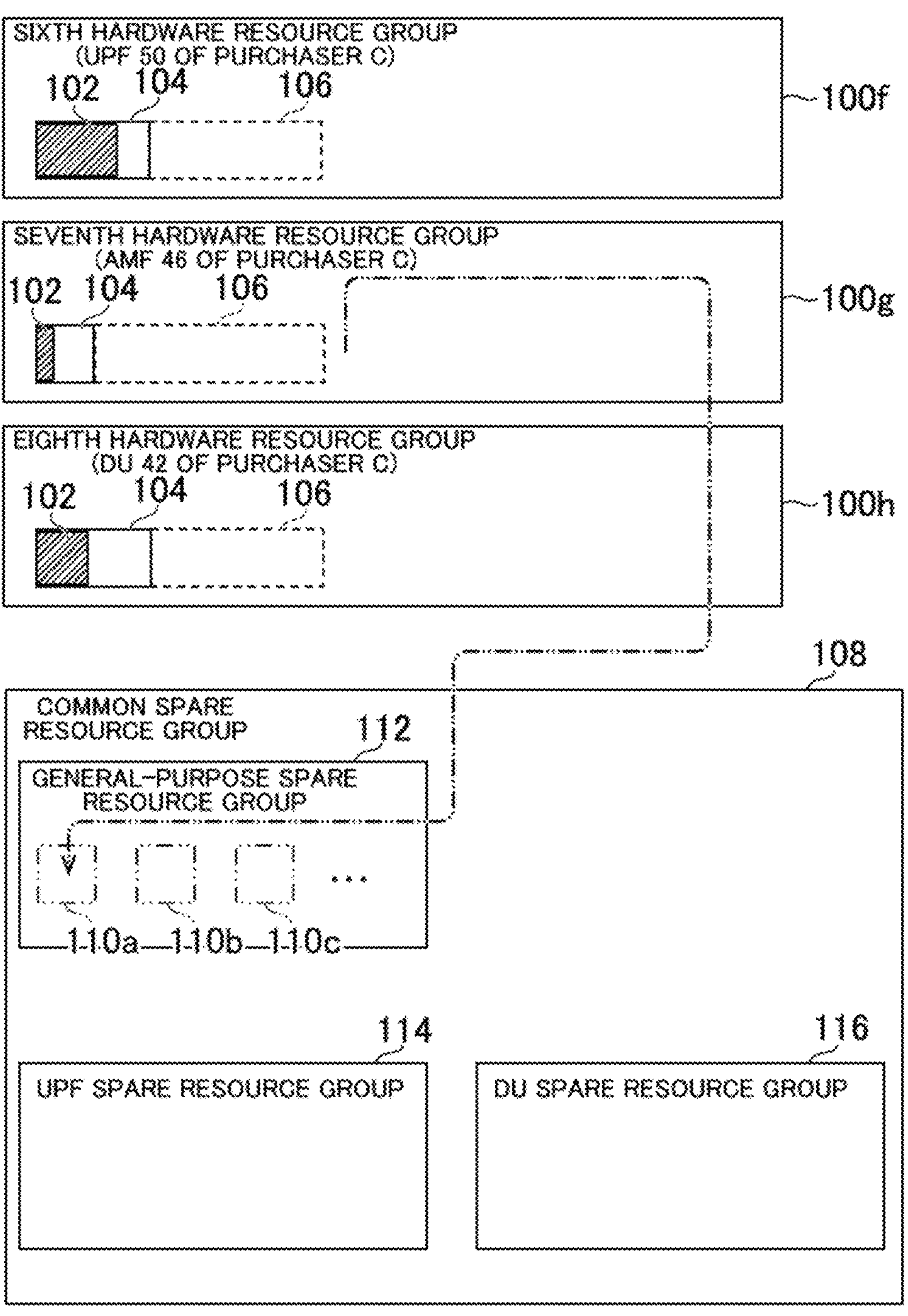
FIG. 13 is a diagram for schematically illustrating an example of allocation of the hardware resources included in the communication system in the one embodiment of the present invention.

Further, for example, it is assumed that, in the situation illustrated in FIG. 12, for example, as illustrated in FIG. 13, the usage status of the seventh hardware resource group 100*g* in which the AMF 46 is operating satisfies the resource deletion condition.

In this case, the configuration manager 76 may change the affiliation of the selected hardware resource from the seventh hardware resource group 100*g* to the general-purpose spare resource group 112.

Figure 14:
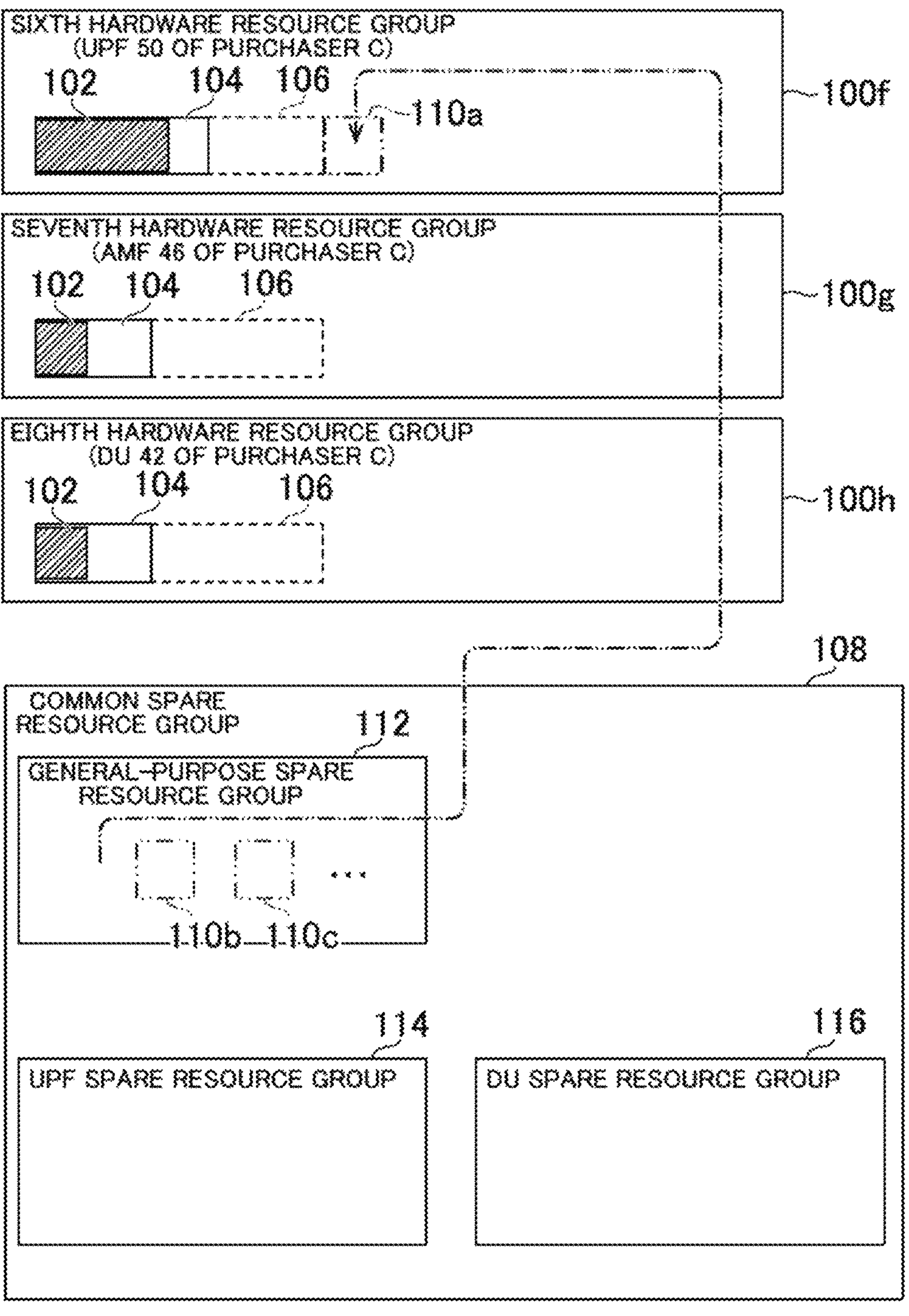
FIG. 14 is a diagram for schematically illustrating an example of allocation of the hardware resources included in the communication system in the one embodiment of the present invention.

Further, it is assumed that, in the situation illustrated in FIG. 11, for example, as illustrated in FIG. 14, the usage status of the sixth hardware resource group 100*f* in which the UPF 50 is operating satisfies the resource addition condition.

In this case, the bare metal manager 96 may execute the setup corresponding to the UPF 50 on the selected hardware resource being the spare resource 110 for which the affiliation is to be changed from the general-purpose spare resource group 112 to the sixth hardware resource group 100*f*. In this case, for example, the spare resource 110*a* corresponds to the selected hardware resource. The configuration manager 76 may then change the affiliation of the selected hardware resource on which the setup has been executed from the common spare resource group 108 to the sixth hardware resource group 100*f*.

Further, in the case described above, the bare metal manager 96 may execute a setup corresponding to the type of the application operating in the sixth hardware resource group 100*f* on the hardware resource (for example, the above-mentioned selected hardware resource) included in the common spare resource group 108 in response to the usage status of the sixth hardware resource group 100*f* satisfying the resource addition condition associated with the hardware resource group 100.

Figure 15:
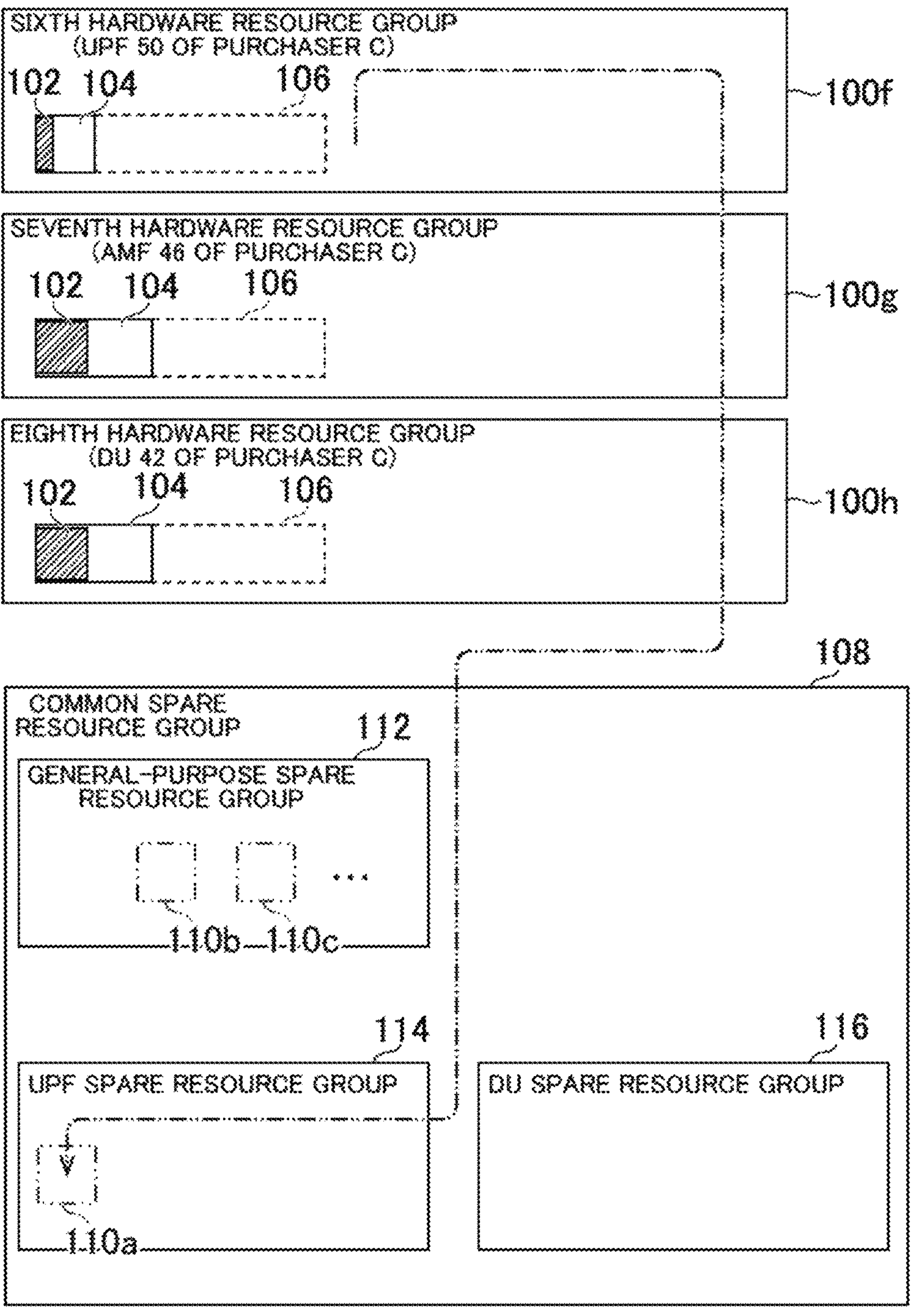
FIG. 15 is a diagram for schematically illustrating an example of allocation of the hardware resources included in the communication system in the one embodiment of the present invention.

For example, it is assumed that, in the situation illustrated in FIG. 14, for example, as illustrated in FIG. 15, the usage status of the sixth hardware resource group 100*f* in which the UPF 50 is operating satisfies the resource deletion condition.

In this case, the configuration manager 76 may change the affiliation of the selected hardware resource from the sixth hardware resource group 100*f* to the UPF spare resource group 114. After that, when the usage status of the hardware resource group 100 in which the UPF 50 is operating satisfies the resource addition condition, the affiliation of the selected hardware resource may be changed to the hardware resource group 100.

Figure 16:
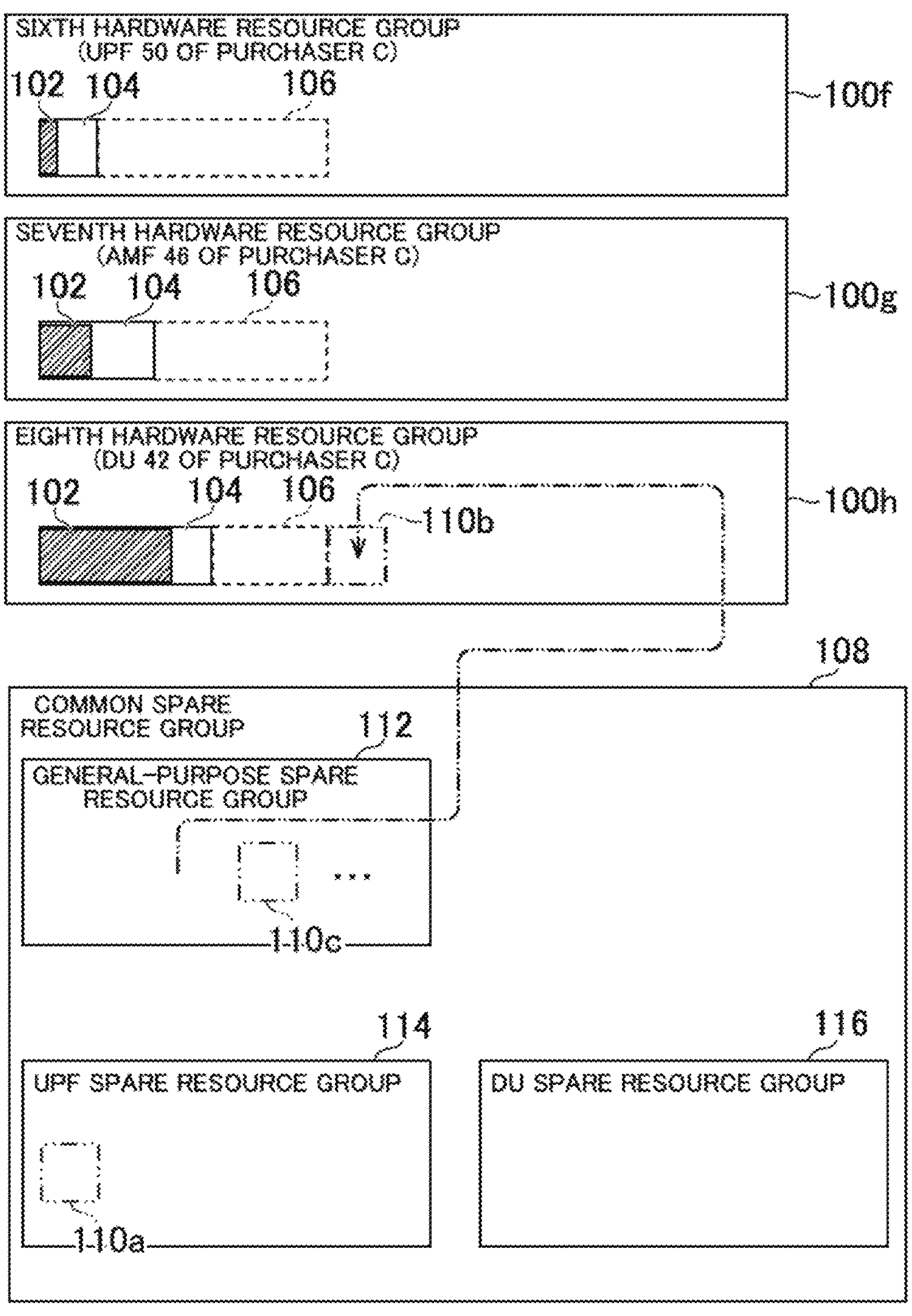
FIG. 16 is a diagram for schematically illustrating an example of allocation of the hardware resources included in the communication system in the one embodiment of the present invention.

It is assumed that, in the situation illustrated in FIG. 15, for example, as illustrated in FIG. 16, the usage status of the eighth hardware resource group 100*h* in which the DU 42 is operating then satisfies the resource addition condition.

In this case, the bare metal manager 96 may execute the setup corresponding to the DU 42 on the selected hardware resource for which the affiliation is to be changed from the general-purpose spare resource group 112 to the eighth hardware resource group 100*h*. In this case, for example, the spare resource 110*b* corresponds to the selected hardware resource. The configuration manager 76 may then change the affiliation of the selected hardware resource on which the setup has been executed from the common spare resource group 108 to the eighth hardware resource group 100*h*.

Further, in the case described above, the bare metal manager 96 may execute a setup corresponding to the type of the application operating in the eighth hardware resource group 100*h* on the hardware resource (for example, the selected hardware resource) included in the general-purpose spare resource group 112 in response to the usage status of eighth hardware resource group 100*h* satisfying the resource addition condition associated with the hardware resource group 100.

Figure 17:
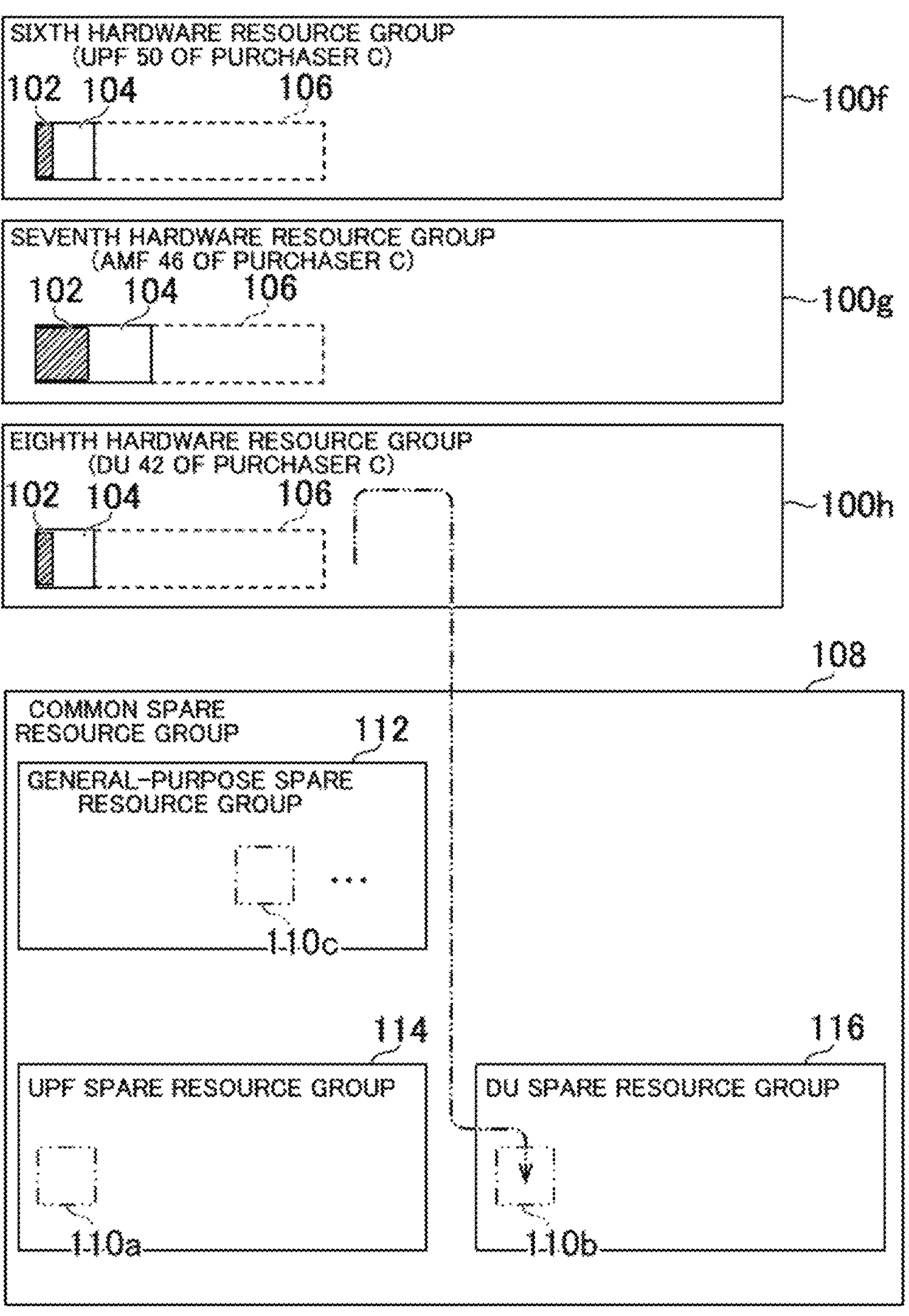
FIG. 17 is a diagram for schematically illustrating an example of allocation of the hardware resources included in the communication system in the one embodiment of the present invention.

It is assumed that, in the situation illustrated in FIG. 16, for example, as illustrated in FIG. 17, the usage status of the eighth hardware resource group 100*h* in which the DU 42 is operating satisfies the resource deletion condition.

In this case, the configuration manager 76 may change the affiliation of the selected hardware resource from the eighth hardware resource group 100*h* to the DU spare resource group 116. After that, when the usage status of the hardware resource group 100 in which the DU 42 is operating satisfies the resource addition condition, the affiliation of the selected hardware resource may be changed to the hardware resource group 100.

As a result of this, when there are a plurality of the above-mentioned predetermined types, for each of those types, in a case in which of the usage status of the hardware resource group 100 in which the predetermined type of application is operating satisfies the resource addition condition, when there is a spare hardware resource on which the setup corresponding to the type has been executed, it is possible to smoothly add the spare resource 110 to the hardware resource group 100 without executing the setup on a hardware resource on which the setup has not been executed.

Further, as a result of this, in the initial state, when there are a plurality of predetermined types of applications, even when the setup corresponding to each of the predetermined types of applications has not been executed on the spare resource 110 in advance, the spare resource 110 can be added to the hardware resource group 100 in which the application of that type is operating.

Further, also in the above-mentioned case, it is possible to improve the durability of the hardware resource because the number of read and write times of the storage can be reduced, for example.

In addition, in this embodiment, in the initial state, the special spare resource group may include a spare resource 110 on which a setup corresponding to the type of the application associated with the special spare resource group has been executed.

Further, in this embodiment, when a ratio between hardware resource amount included in the special spare resource group and a hardware resource amount included in the general-purpose spare resource group 112 does not satisfy a predetermined ratio condition, the configuration manager 76 may change the affiliation of a hardware resource included in one of the special spare resource group or the general-purpose spare resource group 112 from the one of the special spare resource group or the general-purpose spare resource group 112 to the other of the special spare resource group or the general-purpose spare resource group 112 such that the ratio condition is satisfied.

In this case, the bare metal manager 96 may execute, on a hardware resource for which the affiliation is to be changed from a general-purpose spare resource group 112 to a special spare resource group, a setup corresponding to the type of the application associated with the special spare resource group.

Further, regarding a hardware resource for which the affiliation is to be changed from the special spare resource group to the general-purpose spare resource group 112, the bare metal manager 96 may return the hardware resource on which the setup has been executed to a state of before execution of the setup. The process for returning the hardware resource on which the above-mentioned setup has been executed to the state of before the execution of the setup is hereinafter referred to as "unsetup."

In this case, for example, the configuration manager 76 may determine the above-mentioned ratio based on an actual usage performance of the hardware resource. For example, the ratio between the amount of a spare resource 110 included in the special spare resource group and the amount of the spare resource 110 included in the general-purpose spare resource group 112 may be determined based on, for a predetermined period in the past, the ratio between an actual usage rate of a hardware resource in a hardware resource group 100 in which the application of the predetermined type is operating and the actual usage rate of the hardware resource in a hardware resource group 100 in which an application other than the predetermined type is operating.

The above-mentioned ratio condition may also be determined for each period type. For example, the ratio condition may be determined for each of weekdays and holidays. Further, the ratio condition may be determined for each of daytime and nighttime. Then, based on the ratio condition determined for the period type to which the current time belongs, the affiliation of the hardware resource included in one of the special spare resource group or the general-purpose spare resource group 112 may be changed from the one of the special spare resource group or the general-purpose spare resource group 112 to the other of the special spare resource group or the general-purpose spare resource group 112.

As a result of this, it becomes possible to secure a hardware resource for which setup has been executed in the common spare resource group 108.

Further, in this embodiment, when the surplus level of a hardware resource included in the special spare resource group satisfies a predetermined replenishment condition, the configuration manager 76 may change the affiliation of a hardware resource included in the general-purpose spare resource group 112 from the general-purpose spare resource group 112 to the special spare resource group. The replenishment condition may be the same as or different from the surplus condition described above.

For example, when the special spare resource group does not include the spare resource 110 and is empty, the configuration manager 76 may change the affiliation of the hardware resource included in the general-purpose spare resource group 112 from the general-purpose spare resource group 112 to the special spare resource group.

In this case, the bare metal manager 96 may execute, on the hardware resource for which the affiliation is to be changed from the general-purpose spare resource group 112 to the special spare resource group, a setup corresponding to the type of the application associated with the special spare resource group.

The processes described above may be executed in a batch process, for example, at night or on holidays.

Also in this case, it becomes possible to secure a hardware resource for which setup has been executed in the common spare resource group 108.

Further, in this embodiment, the affiliation of the spare resource 110 may be changed from the common spare resource group 108 to the hardware resource group 100 in which the application purchased by the purchaser is operating in response to a request by the purchaser of the network service.

Further, the purchaser of the network service may be able to set whether or not the affiliation of the spare resource 110 is to be changed when a resource addition condition set in advance is satisfied as described above.

Further, in response to the usage status of the hardware resource group 100 satisfying the resource addition condition, the purchaser of the network service may be notified of a query about whether addition of a hardware resource is required. Then, in response to the purchaser approving the addition of the resource, the affiliation of the spare resource 110 may be changed from the common spare resource group 108 to the hardware resource group 100 in which the application purchased by the purchaser is operating.

Similarly, in response to the usage status of the hardware resource group 100 satisfying the resource deletion condition, the purchaser of the network service may be notified of a query about whether deletion of a hardware resource is required. Then, in response to the purchaser approving the deletion of the resource, the affiliation of the spare resource 110 may be changed from the hardware resource groups 100 in which the application purchased by the purchaser is operating to the common spare resource group 108.

Further, the resource addition condition and the resource deletion condition may each be a condition relating to the number of servers in which an application is operating or the number of available servers. For example, the affiliation of the hardware resource included in the common spare resource group 108 may be changed from the common spare resource group 108 to the hardware resource group 100 in response to the number of available servers included in the hardware resource group 100 becoming equal to or less than a predetermined number.

Further, the resource addition condition and the resource deletion condition may each be a condition relating to the number of virtual machines (VMs) in which an application is operating or the number of available VMs. For example, the affiliation of the hardware resource included in the common spare resource group 108 may be changed from the common spare resource group 108 to the hardware resource group 100 in response to the number of available VMs included in the hardware resource group 100 becoming equal to or less than a predetermined number.

Now, an example of a flow of a process relating to the addition of a hardware resource to the hardware resource group 100, which is performed by the platform system 30 in this embodiment, is described with reference to a flow chart exemplified in FIG. 18.

Figure 18:
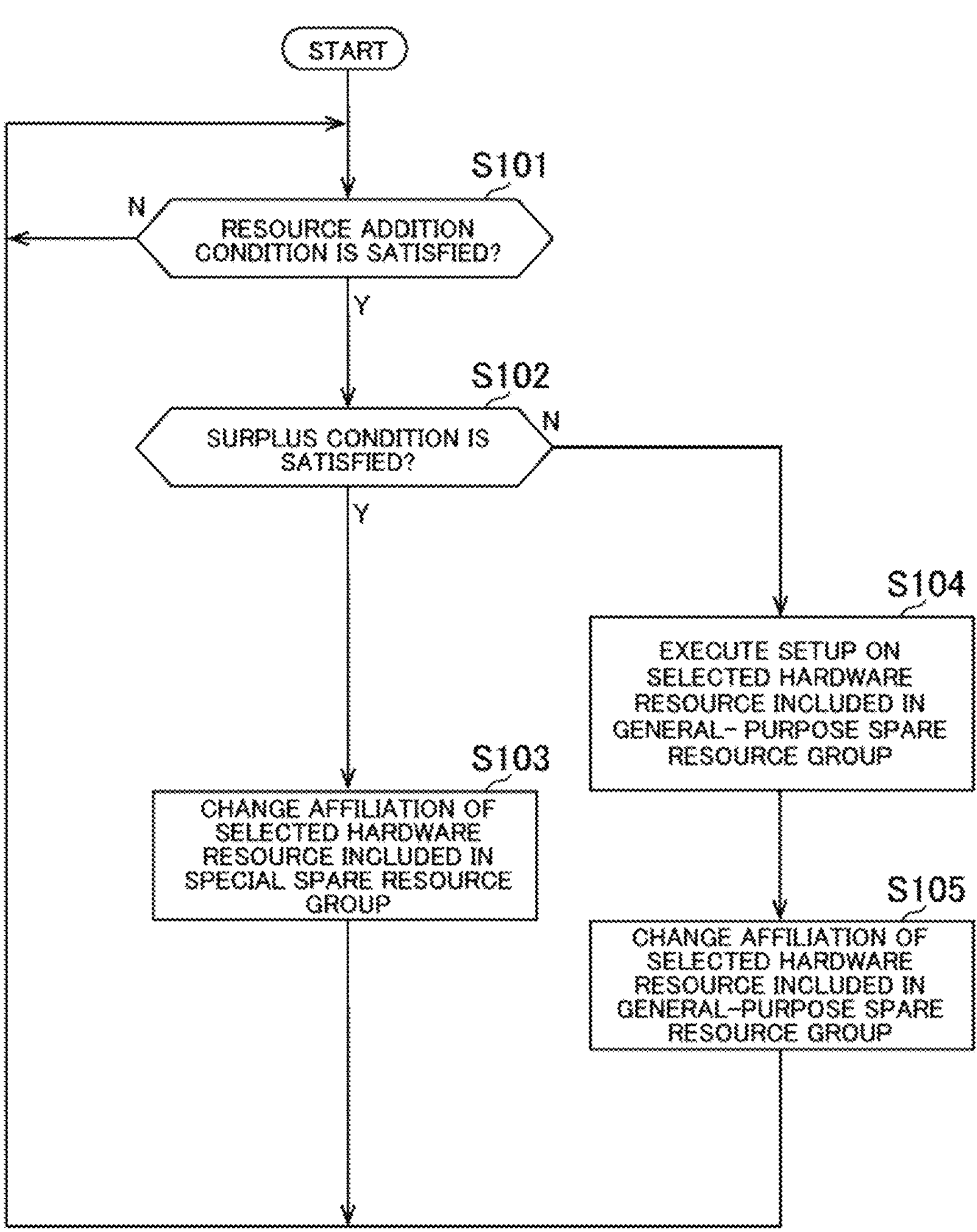
FIG. 18 is a flow chart for illustrating an example of a flow of a process performed by the platform system in the one embodiment of the present invention.

The process exemplified in FIG. 18 is executed on all the hardware resource groups 100 which are included in the communication system 1 and in which the above-mentioned predetermined type of application (for example, UPF 50 or DU 42) is operating.

In this process example, the policy manager 90 monitors whether the usage status of the hardware resource group 100 satisfies the resource addition condition (Step S101).

In this case, when the policy manager 90 determines that the usage status of the hardware resource group 100 satisfies the resource addition condition ("Y" in Step S101), the configuration manager 76 determines whether or not the surplus level of the hardware resource included in the special spare resource group associated with the type of the application operating in the hardware resource group 100 satisfies a predetermined surplus condition (Step S102).

When the surplus condition is satisfied ("Y" in Step S102), the configuration manager 76 changes the affiliation of the selected hardware resource included in the special spare resource group from the special spare resource group to the hardware resource group 100 (Step S103), and the process returns to the process step of Step S101.

When the surplus condition is not satisfied ("N" in Step S102), the bare metal manager 96 executes a setup corresponding to the type of the application operating in the hardware resource group 100 on the selected hardware resource included in the general-purpose spare resource group 112 (Step S104).

Then, the configuration manager 76 changes the affiliation of the selected hardware resource on which the setup has been executed in the process step of Step S104 from the general-purpose spare resource group 112 to the hardware resource group 100 (Step S105), and the process returns to the process step of Step S101.

The process steps of from Step S102 to S105 are not executed on hardware resource groups 100 in which applications other than the above-mentioned predetermined type of application (for example, UPF 50 or DU 42) are operating. Instead, when the policy manager 90 determines that the usage status of the hardware resource group 100 satisfies the resource addition condition ("Y" in Step S101), the configuration manager 76 changes the affiliation of the selected hardware resource included in the general-purpose spare resource group 112 from the general-purpose spare resource group 112 to the hardware resource group 100, and the process returns to the process step of Step S101.

Next, an example of a flow of a process relating to the deletion of a hardware resource from the hardware resource group 100, which is performed by the platform system 30 in this embodiment, is described with reference to a flow chart exemplified in FIG. 19.

Figure 19:
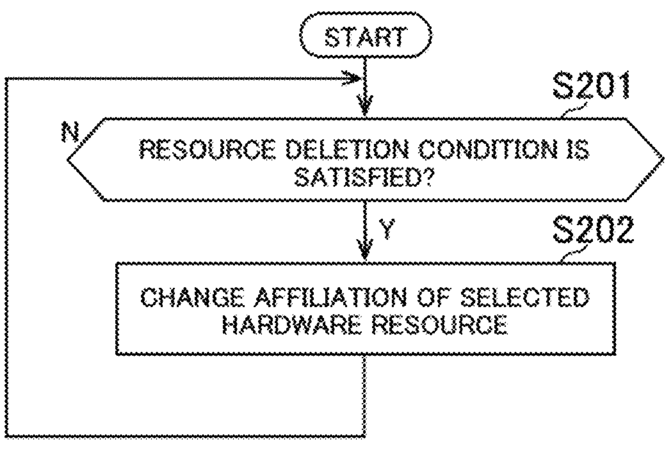
FIG. 19 is a flow chart for illustrating an example of a flow of a process performed by the platform system in the one embodiment of the present invention.

The process exemplified in FIG. 19 is executed on all the hardware resource groups 100 included in the communication system 1.

In this process example, the policy manager 90 monitors whether the usage status of the hardware resource group 100 satisfies the resource deletion condition (Step S201).

In this case, when the policy manager 90 determines that the usage status of the hardware resource group 100 satisfies the resource deletion condition ("Y" in Step S201), the configuration manager 76 changes the affiliation of the selected hardware resource from the hardware resource group 100 to the spare resource group associated with the type of the application operating in the hardware resource group 100 (Step S202), and the process returns to the process step of S201.

In the process step of Step S202, for example, when the type of the application operating in the hardware resource group 100 which has satisfied the resource deletion condition is the above-mentioned predetermined type, the affiliation of the selected hardware resource is changed from the hardware resource group 100 to the special spare resource group associated with the type of the application operating in the hardware resource group 100.

Further, in the process step of Step S202, for example, when the type of the application operating in the hardware resource group 100 which has satisfied the resource deletion condition is a type other than the above-mentioned predetermined type, the affiliation of the selected hardware resource is changed from the hardware resource group 100 to the general-purpose spare resource group 112.

It should be noted that the present invention is not limited to the above-mentioned embodiment.

For example, the process executed by the bare metal manager 96 described above may be executed by the configuration manager 76, for example. Conversely, the process executed by the configuration manager 76 described above may be executed by the bare metal manager 96, for example.

Further, the functional unit in this embodiment is not limited to those illustrated in FIG. 3.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware such as an electronic circuit. Further, the functional unit in this embodiment may be implemented by a combination of an electronic circuit and software.

The technology disclosed in the present disclosure can also be expressed as follows.

[1] A resource management system including: usage status monitoring means for monitoring a usage status of each of a plurality of hardware resource groups included in communication system; resource addition means for changing, in response to the usage status of any one of the plurality of hardware resource groups satisfying a resource addition condition associated with the hardware resource group, an affiliation of a hardware resource included in a common spare resource group different from all of the plurality of hardware resource groups from the common spare resource group to the hardware resource group; and setup execution means for executing a setup corresponding to a predetermined type of application, wherein the resource addition means is configured to change, when a surplus level of a hardware resource included in a special spare resource group which is a part of the common spare resource group and which includes hardware resources on which the setup corresponding to the predetermined type has been executed satisfies a predetermined surplus condition, in response to the usage status of any one of the plurality of hardware resource groups in which the predetermined type of the application is operating satisfying the resource addition condition associated with the hardware resource group, the affiliation of the hardware resource included in the special spare resource group from the special spare resource group to the hardware resource group, and wherein the setup execution means is configured to execute, when the surplus level of the hardware resource included in the special spare resource group does not satisfy the predetermined surplus condition, in response to the usage status of any one of the plurality of hardware resource groups in which the predetermined type of the application is operating satisfying the resource addition condition associated with the hardware resource group, the setup corresponding to the predetermined type of the application on a hardware resource included in a general-purpose spare resource group which is a part of the common spare resource group and which includes hardware resources on which the setup has not been executed, and the resource addition means is configured to change the affiliation of the hardware resource on which the setup has been executed from the general-purpose spare resource group to the hardware resource group.

[2] The resource management system according to Item [1], wherein the common spare resource group includes a plurality of the special spare resource groups each of which is associated with a type of application, and which includes hardware resources on which a setup corresponding to the type of the application has been executed, and the resource addition means is configured to change, when a surplus level of a hardware resource included in any one of the plurality of the special spare resource groups satisfies the predetermined surplus condition associated with the special spare resource group, in response to the usage status of the hardware resource group in which the application associated with the special spare resource group is operating satisfying the resource addition condition associated with the one of the hardware resource group, the affiliation of the hardware resource included in the special spare resource group from the special spare resource group to the hardware resource group.

[3] The resource management system according to Item [1] or [2], wherein the setup execution means is configured to execute, when the surplus level of the hardware resource included in the special spare resource group does not satisfy the predetermined surplus condition, in response to the usage status of any one of the plurality of hardware resource groups in which the predetermined type of the application is operating satisfying the resource addition condition associated with the hardware resource group, the setup corresponding to the predetermined type of the application on a selected hardware resource selected from the general-purpose spare resource group, and the resource addition means is configured to change the affiliation of the selected hardware resource on which the setup has been executed from the general-purpose spare resource group to the hardware resource group, and further including resource deletion means for changing, in response to the usage status of the any one of the plurality of hardware resource groups satisfying a resource deletion condition associated with the hardware resource group, the affiliation of the selected hardware resource on which the setup has been executed from the hardware resource group to the special spare resource group.

[4] The resource management system according to any one of Items [1] to [3], further including resource adjustment means for changing, when a ratio between a hardware resource amount included in the special spare resource group and a hardware resource amount included in the general-purpose spare resource group does not satisfy a predetermined ratio condition, the affiliation of a hardware resource included in one of the special spare resource group or the general-purpose spare resource group from the one of the special spare resource group or the general-purpose spare resource group to another of the special spare resource group or the general-purpose spare resource group such that the predetermined ratio condition is satisfied, wherein the setup execution means is configured to execute the setup corresponding to the predetermined type of the application on the hardware resource for which the affiliation is to be changed from the general-purpose spare resource group to the special spare resource group, and further including unsetup execution means for returning, on the hardware resource for which the affiliation is to be changed from the special spare resource group to the general-purpose spare resource group, the hardware resource on which the setup has been executed to a state of before execution of the setup.

[5] The resource management system according to Item [4], further including ratio determination means for determining the ratio based on an actual usage performance of the hardware resource.

[6] The resource management system according to any one of Items [1] to [3], further including resource adjustment means for changing, when the surplus level of the hardware resource included in the special spare resource group satisfies predetermined replenishment condition, the affiliation of a hardware resource included in the general-purpose spare resource group from the general-purpose spare resource group to the special spare resource group, and wherein the setup execution means is configured to execute the setup corresponding to the predetermined type of the application on the hardware resource for which the affiliation is to be changed from the general-purpose spare resource group to the special spare resource group.

[7] The resource management system according to any one of Items [1] to [6], wherein the resource addition condition is a condition relating to an actual usage amount of a hardware resource, an actual usage rate of the hardware resource, an actual surplus amount of the hardware resource, or an actual surplus rate of the hardware resource.

[8] The resource management system according to any one of Items [1] to [6], wherein the resource addition condition is a condition relating to a maximum hardware resource amount estimated to be used for operation of an application in the hardware resource group, or a maximum hardware resource rate estimated to be used for operation of the application in the hardware resource group.

[9] The resource management system according to any one of Items [1] to [8], wherein the resource addition condition is a condition associated with the number of applications operating in the hardware resource group.

[10] The resource management system according to any one of Items [1] to [9], wherein the resource addition condition is a condition selected by a purchaser of an application operating in the hardware resource group from a range associated with a type of the application, or is a condition selected by the purchaser of the application operating in the hardware resource group from among a plurality of options associated with the type of the application.

[11] The resource management system according to any one of Items [1] to [10], wherein an application purchased by a purchaser different from a purchaser of an application operating in any one of the plurality of hardware resource groups is operating in another one of the plurality of hardware resource groups.

[12] The resource management system according to any one of Items [1] to [11], wherein the usage status monitoring means is configured to monitor the usage status of each of a plurality of server groups included in the communication system, and the resource addition means is configured to change, in response to the usage status of any one of the plurality of server groups satisfying a server addition condition associated with the server group, an affiliation of a server included in a common spare server group different from all of the plurality of server groups from the common spare server group to the server group.

[13] The resource management system according to any one of Items [1] to [12], wherein each of the plurality of hardware resource groups corresponds to a cluster managed by a container management tool.

[14] A resource management method including: monitoring a usage status of each of a plurality of hardware resource groups included in a communication system; changing, when a surplus level of a hardware resource included in a special spare resource group which is a part of a common spare resource group different from all of the plurality of hardware resource groups and which includes hardware resources on which a setup corresponding to a predetermined type of application has been executed satisfies a predetermined surplus condition, in response to the usage status of any one of the plurality of hardware resource groups in which the predetermined type of the application is operating satisfying a resource addition condition associated with the hardware resource group, an affiliation of the hardware resource included in the special spare resource group from the special spare resource group to the hardware resource group; and executing, when the surplus level of the hardware resource included in the special spare resource group does not satisfy the predetermined surplus condition, in response to the usage status of any one of the plurality of hardware resource groups in which the predetermined type of the application is operating satisfying the resource addition condition associated with the hardware resource group, a setup corresponding to the predetermined type of the application on a hardware resource included in a general-purpose spare resource group which is a part of the common spare resource group and which includes hardware resources on which the setup has not been executed, and changing the affiliation of the hardware resource on which the setup has been executed from the general-purpose spare resource group to the hardware resource group.

The invention claimed is:

1. A resource management system, comprising one or more processors, the resource management system causing at least one of the one or more processors to execute:

a usage status monitoring process of monitoring a usage status of each of a plurality of hardware resource groups included in a communication system;

a resource addition process of changing, in response to the usage status of any one of the plurality of hardware resource groups satisfying a resource addition condition associated with the hardware resource group, an affiliation of a hardware resource included in a common spare resource group different from all of the plurality of hardware resource groups from the common spare resource group to the hardware resource group; and a setup execution process of executing setup corresponding to a predetermined type of application, wherein, when a surplus level of a hardware resource included in a special spare resource group which is a part of the common spare resource group and which includes hardware resources on which the setup corresponding to the predetermined type has been executed satisfies a predetermined surplus condition, in response to the usage status of any one of the plurality of hardware resource groups in which the predetermined type of the application is operating satisfying the resource addition condition associated with the hardware resource group, in the resource addition process, the affiliation of the hardware resource included in the special spare resource group is changed from the special spare resource group to the hardware resource group, and wherein, when the surplus level of the hardware resource included in the special spare resource group does not satisfy the predetermined surplus condition, in response to the usage status of any one of the plurality of hardware resource groups in which the predetermined type of the application is operating satisfying the resource addition condition associated with the hardware resource group, in the setup execution process, the setup corresponding to the predetermined type of the application is executed on a hardware resource included in a general-purpose spare resource group which is a part of the common spare resource group and which includes hardware resources on which the setup has not been executed, and in the resource addition process, the affiliation of the hardware resource on which the setup has been executed is changed from the general-purpose spare resource group to the hardware resource group.

2. The resource management system according to claim 1, wherein the common spare resource group includes a plurality of the special spare resource groups each of which is associated with a type of application, and which includes hardware resources on which a setup corresponding to the type of the application has been executed, and wherein, in the resource addition process, when a surplus level of a hardware resource included in any one of the plurality of the special spare resource groups satisfies the predetermined surplus condition associated with the special spare resource group, in response to the usage status of the hardware resource group in which the application associated with the special spare resource group is operating satisfying the resource addition condition associated with the hardware resource group, the affiliation of the hardware resource included in the special spare resource group is changed from the special spare resource group to the hardware resource group.

3. The resource management system according to claim 1, wherein when the surplus level of the hardware resource included in the special spare resource group does not satisfy the predetermined surplus condition, in response to the usage status of any one of the plurality of hardware resource groups in which the predetermined type of the application is operating satisfying the resource addition condition associated with the hardware resource group, in the setup execution process, the setup corresponding to the predetermined type of the application is executed on a selected hardware resource selected from the general-purpose spare resource group, and, in the resource addition process, the affiliation of the selected hardware resource on which the setup has been executed is changed from the general-purpose spare resource group to the hardware resource group, and wherein the resource management system causes the at least one of the one or more processors to execute a resource deletion process of changing, in response to the usage status of the any one of the plurality of hardware resource groups satisfying a resource deletion condition associated with the hardware resource group, the affiliation of the selected hardware resource on which the setup has been executed from the hardware resource group to the special spare resource group.

4. The resource management system according to claim 1, wherein the resource management system causes the at least one of the one or more processors to execute a resource adjustment process of changing, when a ratio between a hardware resource amount included in the special spare resource group and a hardware resource amount included in the general-purpose spare resource group does not satisfy a predetermined ratio condition, the affiliation of a hardware resource included in one of the special spare resource group or the general-purpose spare resource group from the one of the special spare resource group or the general-purpose spare resource group to another of the special spare resource group or the general-purpose spare resource group such that the predetermined ratio condition is satisfied, wherein, in the setup execution process, the setup corresponding to the predetermined type of the application is executed on the hardware resource for which the affiliation is to be changed from the general-purpose spare resource group to the special spare resource group, and wherein the resource management system causes the at least one of the one or more processors to execute, on the hardware resource for which the affiliation is to be changed from the special spare resource group to the general-purpose spare resource group, an unsetup execution process of returning the hardware resource on which the setup has been executed to a state of before execution of the setup.

5. The resource management system according to claim 4, wherein the resource management system causes the at least one of the one or more processors to execute a ratio determination process of determining the ratio based on an actual usage performance of the hardware resource.

6. The resource management system according to claim 1, wherein the resource management system causes the at least one of the one or more processors to execute a resource adjustment process of changing, when the surplus level of the hardware resource included in the special spare resource group satisfies a predetermined replenishment condition, the affiliation of a hardware resource included in the general-purpose spare resource group from the general-purpose spare resource group to the special spare resource group, and wherein, in the setup execution process, the setup corresponding to the predetermined type of the application is executed on the hardware resource for which the affiliation is to be changed from the general-purpose spare resource group to the special spare resource group.

7. The resource management system according to claim 1, wherein the resource addition condition is a condition relating to an actual usage amount of a hardware resource, an actual usage rate of the hardware resource, an actual surplus amount of the hardware resource, or an actual surplus rate of the hardware resource.

8. The resource management system according to claim 1, wherein the resource addition condition is a condition relating to a maximum hardware resource amount estimated to be used for operation of an application in the hardware resource group, or a maximum hardware resource rate estimated to be used for operation of the application in the hardware resource group.

9. The resource management system according to claim 1, wherein the resource addition condition is a condition associated with the number of applications operating in the hardware resource group.

10. The resource management system according to claim 1, wherein the resource addition condition is a condition selected by a purchaser of an application operating in the hardware resource group from a range associated with a type of the application, or is a condition selected by the purchaser of the application operating in the hardware resource group from among a plurality of options associated with the type of the application.

11. The resource management system according to claim 1, wherein an application purchased by a purchaser different from a purchaser of an application operating in any one of the plurality of hardware resource groups is operating in another one of the plurality of hardware resource groups.

12. The resource management system according to claim 1, wherein, in the usage status monitoring process, the usage status of each of a plurality of server groups included in the communication system is monitored, and wherein, in the resource addition process, in response to the usage status of any one of the plurality of server groups satisfying a server addition condition associated with the server group, an affiliation of a server included in a common spare server group different from all of the plurality of server groups is changed from the common spare server group to the server group.

13. The resource management system according to claim 1, wherein each of the plurality of hardware resource groups corresponds to a cluster managed by a container management tool.

14. A resource management method, comprising:

monitoring a usage status of each of a plurality of hardware resource groups included in a communication system;

changing, when a surplus level of a hardware resource included in a special spare resource group which is a part of a common spare resource group different from all of the plurality of hardware resource groups and which includes hardware resources on which a setup corresponding to a predetermined type of application has been executed satisfies a predetermined surplus condition, in response to the usage status of any one of the plurality of hardware resource groups in which the predetermined type of the application is operating satisfying a resource addition condition associated with the hardware resource group, an affiliation of the hardware resource included in the special spare resource group from the special spare resource group to the hardware resource group; and executing, when the surplus level of the hardware resource included in the special spare resource group does not satisfy the predetermined surplus condition, in response to the usage status of any one of the plurality of hardware resource groups in which the predetermined type of the application is operating satisfying the resource addition condition associated with the hardware resource group, setup corresponding to the predetermined type of the application on a hardware resource included in a general-purpose spare resource group which is a part of the common spare resource group and which includes hardware resources on which the setup has not been executed, and changing the affiliation of the hardware resource on which the setup has been executed from the general-purpose spare resource group to the hardware resource group.

* * * * *